United States Patent
Ashikaga et al.

(10) Patent No.: US 12,371,378 B2
(45) Date of Patent: Jul. 29, 2025

(54) STRUCTURE PROTECTION SHEET, CONCRETE BLOCK, AND METHOD FOR MANUFACTURING REINFORCED STRUCTURE

(71) Applicant: Keiwa Incorporated, Tokyo (JP)

(72) Inventors: Masao Ashikaga, Tokyo (JP); Yoshiki Nakajima, Tokyo (JP); Toshikatsu Furunaga, Tokyo (JP); Noriyuki Horiuchi, Tokyo (JP); Akira Ninomiya, Tokyo (JP); Yukinobu Ikeda, Tokyo (JP); Kenta Shimotani, Tokyo (JP); Yuki Matsuno, Tokyo (JP)

(73) Assignee: Keiwa Incorporated, Tokyo (JP)

( * ) Notice: Subject to any disclaimer, the term of this patent is extended or adjusted under 35 U.S.C. 154(b) by 298 days.

(21) Appl. No.: 17/802,609

(22) PCT Filed: Mar. 2, 2021

(86) PCT No.: PCT/JP2021/007894
§ 371 (c)(1),
(2) Date: Aug. 26, 2022

(87) PCT Pub. No.: WO2021/177286
PCT Pub. Date: Sep. 10, 2021

(65) Prior Publication Data
US 2023/0107548 A1     Apr. 6, 2023

(30) Foreign Application Priority Data

Mar. 3, 2020  (JP) .................................. 2020-036255
Mar. 3, 2020  (JP) .................................. 2020-036256
(Continued)

(51) Int. Cl.
*C04B 28/04*     (2006.01)
*B32B 3/30*      (2006.01)
(Continued)

(52) U.S. Cl.
CPC ................ *C04B 28/04* (2013.01); *B32B 3/30* (2013.01); *B32B 5/028* (2013.01); *B32B 7/12* (2013.01);
(Continued)

(58) Field of Classification Search
CPC ......... B32B 13/12; B32B 13/02; B32B 13/04; B32B 13/14; B32B 3/266; B32B 3/30;
(Continued)

(56) References Cited

U.S. PATENT DOCUMENTS

| 4,392,335 A | 7/1983 | Heiman |
| 2013/0040104 A1 | 2/2013 | Wiercinski et al. |
| 2018/0258325 A1 | 9/2018 | Taniguchi et al. |

FOREIGN PATENT DOCUMENTS

| CN | 108298904 | * | 7/2018 |
| EP | 4000835 A1 | | 5/2022 |

(Continued)

OTHER PUBLICATIONS

International Search Report issued in corresponding International Patent Application No. PCT/JP2021/007894 dated May 18, 2021.
(Continued)

*Primary Examiner* — Camie S Thompson
(74) *Attorney, Agent, or Firm* — Morgan, Lewis & Bockius LLP

(57) ABSTRACT

The present invention provides a structure protection sheet capable of dramatically reducing a construction period to place protective layers on surfaces of structures such as concrete, protecting the structures for a long time, preventing swelling phenomena caused by water vapor inside the concrete, and preventing a decrease in attachability. The present invention relates to a structure protection sheet including: a polymer cement cured layer on a side facing a structure; and a resin layer on the polymer cement cured
(Continued)

layer, the structure protection sheet having a water vapor transmission rate of 10 to 50 g/m²·day.

20 Claims, 10 Drawing Sheets

(30) Foreign Application Priority Data

Mar. 3, 2020 (JP) ................................ 2020-036257
May 20, 2020 (JP) ................................ 2020-088210

(51) Int. Cl.
| | |
|---|---|
| *B32B 5/02* | (2006.01) |
| *B32B 7/12* | (2006.01) |
| *B32B 13/02* | (2006.01) |
| *B32B 13/04* | (2006.01) |
| *B32B 13/14* | (2006.01) |
| *B32B 27/10* | (2006.01) |
| *B32B 27/12* | (2006.01) |
| *B32B 27/32* | (2006.01) |
| *B32B 37/12* | (2006.01) |
| *C04B 14/06* | (2006.01) |
| *C04B 14/30* | (2006.01) |
| *C04B 20/00* | (2006.01) |
| *C04B 24/26* | (2006.01) |
| *C04B 37/00* | (2006.01) |
| *E01D 22/00* | (2006.01) |
| *E04B 1/62* | (2006.01) |
| *E04C 1/40* | (2006.01) |
| *E04G 23/02* | (2006.01) |
| *C04B 111/00* | (2006.01) |
| *C04B 111/23* | (2006.01) |
| *E21D 11/04* | (2006.01) |

(52) U.S. Cl.
CPC .............. *B32B 13/02* (2013.01); *B32B 13/04* (2013.01); *B32B 13/14* (2013.01); *B32B 27/10* (2013.01); *B32B 27/12* (2013.01); *B32B 27/32* (2013.01); *B32B 37/12* (2013.01); *C04B 14/06* (2013.01); *C04B 14/303* (2013.01); *C04B 14/305* (2013.01); *C04B 20/0048* (2013.01); *C04B 24/2641* (2013.01); *C04B 37/008* (2013.01); *E01D 22/00* (2013.01); *E04B 1/625* (2013.01); *E04C 1/40* (2013.01); *E04G 23/02* (2013.01); *B32B 2255/10* (2013.01); *B32B 2255/26* (2013.01); *B32B 2262/0223* (2013.01); *B32B 2262/0246* (2013.01); *B32B 2262/0269* (2013.01); *B32B 2262/0276* (2013.01); *B32B 2262/101* (2013.01); *B32B 2262/106* (2013.01); *B32B 2307/5825* (2013.01); *B32B 2307/7246* (2013.01); *B32B 2307/732* (2013.01); *B32B 2419/00* (2013.01); *C04B 2111/00612* (2013.01); *C04B 2111/23* (2013.01); *E21D 11/04* (2013.01)

(58) Field of Classification Search
CPC .......... B32B 5/028; B32B 7/12; B32B 27/00; B32B 27/10; B32B 27/12; B32B 27/32; B32B 2255/10; B32B 2255/26; B32B 2262/26; B32B 2262/0223; B32B 2262/0269; B32B 2262/0276; B32B 2262/101; B32B 2262/106; B32B 2307/5825; B32B 2307/7246; B32B 2307/732; B32B 2419/00; C04B 28/04; C04B 28/02; C04B 24/2641; C04B 37/008; C04B 41/009; C04B 41/4503; C04B 41/52; C04B 41/61; C04B 41/63; C04B 41/71; C04B 41/483; C04B 41/5079; C04B 41/4596; C04B 41/4861; C04B 2111/00267; C04B 2111/00293; C04B 2111/2015; C04B 2111/27; C04B 2111/72; C04B 2111/00612; C04B 2111/23; C04B 20/0048; C04B 12/06; C04B 12/303; C04B 12/305; E04G 23/02; E04G 2023/0251; E21D 11/00; E21D 11/38; E21D 11/04; E21D 11/08; E04B 1/625; E04B 1/40; E01D 22/00
See application file for complete search history.

(56) References Cited

FOREIGN PATENT DOCUMENTS

| | | | |
|---|---|---|---|
| JP | 52-106464 U | 8/1977 | |
| JP | 3009544 U | 4/1995 | |
| JP | 2000-016886 A | 1/2000 | |
| JP | 2005048367 A | 2/2005 | |
| JP | 2010-144360 A | 7/2010 | |
| JP | 2015189065 A | 11/2015 | |
| JP | 2018-059298 A | 4/2018 | |
| JP | 2018-127843 A | 8/2018 | |
| WO | 2014/007341 A1 | 1/2014 | |

OTHER PUBLICATIONS

Extended European Search Report issued in the corresponding Application No. 21764164.6, dated Feb. 2, 2024.

* cited by examiner (A)

(B)

(a)

(b)

(c)

STRUCTURE PROTECTION SHEET, CONCRETE BLOCK, AND METHOD FOR MANUFACTURING REINFORCED STRUCTURE

TECHNICAL FIELD

The present invention relates to structure protection sheets, concrete blocks, and methods for producing reinforced structures. Specifically, the present invention relates to structure protection sheets which can not only dramatically reduce a construction period to place protective layers on surfaces of structures such as concrete but also protect structures for a long time, concrete blocks using the structure protection sheets, and methods for producing reinforced structures using the structure protection sheets.

BACKGROUND ART

Repair work and reinforcement work are carried out on civil engineering structures, including road bridges, tunnels, river management facilities such as sluice gates, sewer pipes, and harbor quays, as the structures age. Repair work involves repairing defective parts or fragile parts and then repeatedly applying a coating material to the repaired parts. Reinforcement work involves repeatedly applying a reinforcement coating material to the entire part to be reinforced.

The recoating in repair work and reinforcement work is performed in the order of, for example, undercoating, intermediate coating, and final coating. Usually, in intermediate coating or each coating process, coating cannot be continuously performed because each coat needs to be dried. It takes at least five days to form five layers by, for example, undercoating, first intermediate coating, second intermediate coating, first final coating, and second final coating. Moreover, coating is carried out outside and affected by weather. In a rainy weather, drying may be insufficient, or even coating work is cancelled. Therefore, it is difficult to shorten a construction period, and the labor cost increases accordingly. In addition, the construction and the qualities (film thickness, surface roughness, moisture content, and the like) of applied coats tend to be unstable under the influence of the external environment (humidity, temperature, and the like) during the coating process.

Coating is done by troweling, spraying, or the like. Whether stable repair and reinforcement can be achieved by uniform coating depends largely on the skill of a craftsman. Thus, the qualities of applied coats vary according to the skill of the craftsman. Furthermore, along with aging or a decrease in population of construction workers, the number of workers engaged in repairing and reinforcing concrete has been decreasing. Simpler repair methods which can be carried out even not by skilled workers are awaited.

To solve those issues, Patent Literature 1, for example, suggests a technique to provide a sheet and a method which are simple and low cost, reduce a construction period, and reliably prevent concrete from deteriorating. The technique is a concrete repair method including: attaching a concrete repair sheet with a construction adhesive agent to a concrete surface to be repaired, the sheet including an intermediate layer having a resin film and a woven material surface layer stacked via an adhesive resin on each surface of the intermediate layer; and applying a coating composition to the attached concrete repair sheet on a surface opposite to the surface facing the concrete.

Coating materials have also been improved. For example, Patent Literature 2 suggests a method to protect concrete structures using a coating material that can prevent alkali-aggregate reaction, excellently conform to cracks of concrete structures, prevent an applied coat from blistering due to temperature rise after the formation of the coat, and avoid peeling off of concrete. The technique involves forming a base conditioning material coat on a surface of a concrete structure, and then forming a coat on the surface of the base conditioning material coat. The base conditioning material coat includes a composition including a cationic (meth)acryl polymer emulsion and an inorganic hydraulic substance. The coat formed on the surface of the base conditioning material coat includes a composition that contains an alkyl (meth) acrylate emulsion and an inorganic hydraulic substance, and has a degree of elongation at 20° C. of 50 to 2000%, resistance to salt permeation of 10-2 to 10-4 mg/cm$^2$ day, a water vapor transmission rate of not less than 5 g/m$^2$·day, and a film thickness of 100 to 5000 μm.

CITATION LIST

Patent Literature

Patent Literature 1: JP 2010-144360 A
Patent Literature 2: JP 2000-16886 A

SUMMARY OF THE INVENTION

Technical Problem

Conventional concrete repair sheets, including the one in Patent Literature 1, have issues to overcome, such as: differences in adhesive strength between a substrate and other layers (for example, an adhesive layer or a reinforcement member); differences in elongation among a substrate, an adhesive layer, a reinforcement member, etc.; and an adhesion strength between an adhesive layer and concrete. Specifically, when a stress is applied to a concrete repair sheet that includes a substrate and a reinforcement member attached with an adhesive layer, during or after the construction of the sheet, differences in elongation among the substrate, the adhesive layer, and the reinforcement member may cause layer interface separation derived from a difference in the adhesive strength between the substrate and the adhesive layer or between the adhesive layer and the reinforcement member.

The adhesive layer on the concrete repair sheet is softened by heating or the like to be attached to concrete. If the adhesion strength is insufficient, the concrete repair sheet may separate from the surface of the concreate, failing to function as a repair sheet. Moreover, concrete to which a concrete repair sheet is attached sometimes swells with time. Presumably, this phenomenon occurs because the repair sheet has a low water vapor transmission rate and thus prevents water vapor inside the concrete from escaping.

As discussed above in BACKGROUND ART, a method in which a coat is formed by application at a construction site needs one day for one layer coating. For example, it takes six days to form a coat consisting of six layers including undercoat layer(s) and uppercoat layer(s). Such a coat disadvantageously has an uneven film thickness and tends to have unstable qualities and properties such as surface roughness and moisture content.

The present invention aims to solve the above issues and provide structure protection sheets capable of dramatically reducing a construction period to place protective layers on surfaces of structures such as concrete, protecting structures for a long time, preventing swelling phenomena caused by water vapor inside the concrete, and preventing a decrease in attachability, concrete blocks using the structure protection sheets, and construction methods of reinforced structures using the structure protection sheets.

Solution to Problem

The present inventors studied to develop concrete protection sheets capable of stably protecting concrete for a long time without depending on a construction method to form a layer on a concrete surface by a coating technique. As a result, the present inventors established a technical idea that can provide a concrete protection sheet with functions appropriate for the properties of concrete, specifically, water vapor transmittance allowing for emission of moisture in concrete as water vapor, conformity to cracks or swelling of concrete, waterproofness to prevent entry of water or degradation factors such as chloride ion into concrete, resistance to salt permeation, and inhibition of neutralization. Accordingly, the present invention has been completed. This technical idea is applicable as structure protection sheets for non-concrete 25 structures.
(1) A structure protection sheet of the present invention includes: a polymer cement cured layer on a side facing a structure; and a resin layer on the polymer cement cured layer, the structure protection sheet having a water vapor transmission rate of 10 to 50 g/m²·day.

According to the present invention, the polymer cement cured layer on a side facing a structure contains a cement component to exhibit excellent properties including adhesion to structures, and the resin layer on the polymer cement cured layer can impart excellent properties including waterproofness, resistance to salt permeation, and inhibition of neutralization. It is typically presumed that the polymer cement cured layer containing a cement component can be expected to have a certain degree of water vapor transmission rate but the resin layer on the polymer cement cured layer has a lower water vapor transmission rate. In the present invention, however, this is not the case. Since the structure protection sheet as a whole has a water vapor transmission rate within a predetermined range, water vapor inside the structure such as concrete can favorably transmit the sheet to be emitted to the outside after placement of the sheet. Accordingly, swelling can be favorably prevented, and moreover, a decrease in attachability can be prevented. An advantage of the water vapor transmission rate being within the predetermined range is that corrosion of metal (for example, a reinforcing steel) in the structure tends to be suppressed owing to the structure of the sheet easily releasing vapor. When the structure protection sheet is applied to a structure on a rainy day, the surface of the structure is wet and the structure itself contains moisture. Since the structure protection sheet has the above-described water vapor transmission rate, moisture permeating into the structure easily escapes to the outside after the construction (after production of a reinforced structure).

Another advantage of the structure protection sheet of the present invention is that it can be attached to a surface of a structure even in a state where the cement of the structure is not cured, for example, because the water vapor transmission rate thereof can be controlled. Specifically, rapid escape of moisture during molding and curing of cement tends to make the cement porous to decrease the strength of the structure. Attachment of the structure protection sheet of the present invention to the cement before curing can control, for example, the speed of moisture removal during curing of the cement, advantageously avoiding the porous structure.

Furthermore, the structure protection sheet can be mass-produced in a production line including coating and drying in a factory, thereby achieving low cost, dramatic reduction in the work period at a construction site, and long-term protection of structures.

The structure protection sheet of the present invention preferably has a sulfuric acid penetration depth of 0.1 mm or less after immersion in a 5% sulfuric acid aqueous solution for 30 days in a state of covering a building concrete basic block.

Having excellent sulfuric acid resistance, the structure protection sheet of the present invention can be used as a repair sheet particularly suitable for structures in which corrosion due to sulfuric acid occurs, such as sewerage concrete structures.

The structure protection sheet of the present invention may have a contamination removal rate of 95% or higher as measured by contaminating a surface on the side opposite to the side facing the polymer cement cured layer of the resin layer with carbon particle-containing oil, placing the structure protection sheet vertically, and cleaning the contaminated surface with tap water substantially horizontally sprayed vigorously from a hose from a position about two meters away.

According to the invention, the structure protection sheet of the present invention has excellent surface cleanability, and therefore can be used as a repair sheet particularly suitable for structures to which contaminants easily adhere, such as highway walls and tunnel wall surfaces.

In the structure protection sheet of the present invention, the polymer cement cured layer may be a layer containing a cement component and a resin, and the resin may be contained in an amount of 10% by weight or more and 40% by weight or less.

The polymer cement cured layer in the invention is easily formed by controlling the ratio of the cement component and the resin component, and the polymer cement cured layer has excellent conformity and high compatibility and therefore has excellent adhesion. The cement component in the polymer cement cured layer on a side facing a structure increases the adhesion to a structure such as concrete.

The structure protection sheet of the present invention may be used in a state of a stack including two or more sheets.

According to the invention, the structure protection sheet of the present invention can be attached to a structure already protected with the structure protection sheet of the present invention for further protection. Therefore, when two structure protection sheets of the present invention are attached side by side, for example, another sheet of the structure protection sheet of the present invention can be attached so as to cover the boundary between these structure protection sheets.

The structure protection sheet of the present invention preferably has a tear load of 3 to 20 N as measured in conformity with JIS K 6781.

According to the invention, when collapse or destruction of a protected structure occurs, the structure protection sheet is appropriately torn to limit the separation thereof in a small area, and thus it is possible to prevent the collapse or destruction accompanying the separation of the structure protection sheet in a chain reaction manner in a large area. In addition, even in the case where it is necessary to remove only a part of the protected structure, the structure protection sheet can be torn at an arbitrary site, so that the part of the structure can be removed.

The structure protection sheet of the present invention preferably further includes a mesh layer.

According to the invention, the presence of the mesh layer can impart excellent properties such as strength.

The structure protection sheet of the present invention preferably includes the mesh layer at an interface between the polymer cement cured layer and the resin layer.

This invention can achieve not only an excellent effect given by the mesh layer but also excellent adhesion strength between the polymer cement cured layer and the resin layer.

In the structure protection sheet of the present invention, the mesh layer may be present in the polymer cement cured layer.

This invention can provide a structure protection sheet having excellent hardness.

In the structure protection sheet of the present invention, the mesh layer preferably has a line pitch of 50 mm to 1.2 mm (linear density of 0.2 to 8.0 lines/cm).

According to the invention, the mesh layer can be sufficiently impregnated with the material of the polymer cement cured layer, which is likely to further improve the strength of the structure protection sheet of the present invention.

The mesh layer in the structure protection sheet of the present invention may be composed of at least one selected from the group consisting of polypropylene fibers, vinylon fibers, carbon fibers, aramid fibers, glass fibers, polyester fibers, polyethylene fibers, nylon fibers, and acrylic fibers.

According to the invention, the material of the mesh layer can be arbitrarily selected in consideration of adhesion to a resin material used for the resin layer, so that a structure protection sheet excellent in strength can be obtained.

In the structure protection sheet of the present invention, a design property is preferably imparted to either one side of the resin layer.

According to the invention, since the resin layer has a design property, simple attachment of the structure protection sheet to a structure gives a desired design property to the appearance of the structure, thereby contributing to shortening of the construction period.

Such a structure protection sheet is useful, for example, when a desired pattern is to be imparted to the foundation of a building such as a dwelling house.

In the structure protection sheet of the present invention, the design property is preferably imparted by providing a pattern of protrusions and depressions on a surface of the resin layer or by printing.

According to the invention, an excellent design property can be imparted to the structure protection sheet. A pattern of protrusions and depressions on a surface of the resin layer can impart not only a 3D design property but also functions such as sound insulation properties and antifouling properties.

In the structure protection sheet of the present invention, the design property may be imparted to a side opposite to a side facing the polymer cement cured layer of the resin layer.

According to the invention, the structure protection sheet of the present invention has its front face subjected to a treatment for imparting a design property to be more excellent in design property. In a case where embossing treatment is performed, for example, the structure protection sheet has a structure including a pattern of protrusions and depressions on its front face to have a design that gives a more excellent 3D effect.

(2) A concrete block of the present invention is a concrete block using the structure protection sheet of the present invention, wherein the polymer cement cured layer of the structure protection sheet is attached to a surface via an adhesive layer.

The invention uses the structure protection sheet that consists only of a layer including no substrate or no reinforcement member. Thus, the invention enables easy attachment of the structure protection sheet to a surface of a concrete block, allowing even not a skilled worker to stably place the structure protection sheet having a predetermined water vapor transmission rate on a surface of a concrete block. This invention can not only dramatically reduce a construction period but also protect the concrete block for a long time.

A method for producing a reinforced structure using the structure protection sheet of the present invention is the method for producing a reinforced structure of the present invention. The method includes: applying an adhesive agent to a structure; and attaching the structure protection sheet to the structure.

The invention uses the structure protection sheet that consists only of a layer including no substrate or no reinforcement member. Thus, this invention enables easy attachment of the structure protection sheet to a surface of a structure, allowing even not a skilled worker to stably place the structure protection sheet having a predetermined water vapor transmission rate on a surface of the structure. This invention can not only dramatically reduce a construction period but also protect the structure for a long time.

In the method for producing a reinforced structure using the structure protection sheet of the present invention, an undercoat layer may be placed between the structure and the adhesive agent.

In the invention of this embodiment, the adhesion between the structure and the adhesive agent is increased by the undercoat layer placed between them. Thus, the structure protection sheet can stably protect the structure for a long time.

Advantageous Effects of Invention

The present invention can provide a structure protection sheet capable of emitting moisture in structures such as concrete and protecting the structures for a long time, a concrete block using the structure protection sheet, and a construction method using the structure protection sheet. In particular, the structure protection sheet is provided with functions appropriate for the properties of a structure and thus achieves conformity to cracks or swelling of the structure, prevention of entry of water or degradation factors such as chloride ion into the structure, transmittance allowing for emission of degradation factors from the structure, and the like.

Furthermore, the present invention advantageously improves the stability and uniformity of the quality, compared to layers formed so far by manual coating.

DESCRIPTION OF EMBODIMENTS

Hereinbelow, the structure protection sheet of the present invention, a concrete block using the structure protection sheet, and a construction method using the structure protection sheet are described with reference to the drawings. The present invention may be variously modified, provided that the technical feature is maintained, and is not limited to the following embodiments and drawings.

[Structure Protection Sheet]

Figure 1:
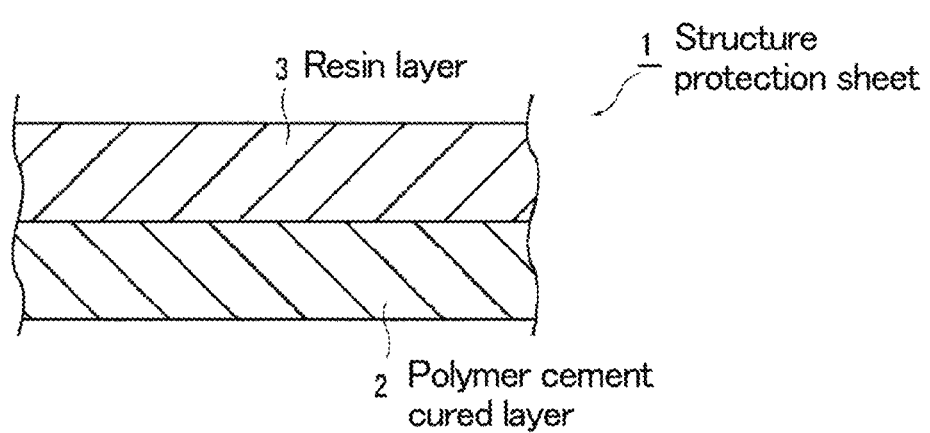
FIG. 1 illustrates cross-sectional structural views showing one example of the structure protection sheet of the present invention.
Figure 1:
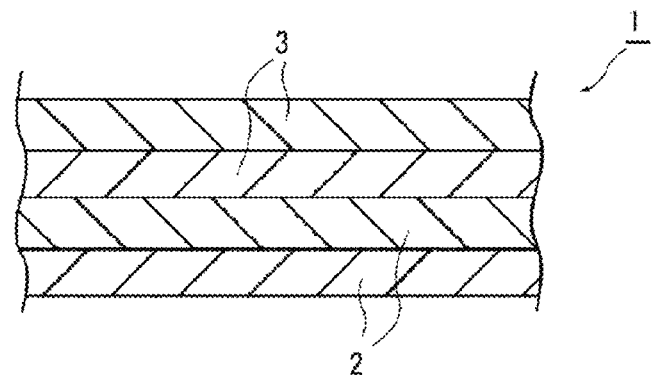

As illustrated in FIG. 1 or FIG. 3(C), a structure protection sheet 1 of the present invention includes: a polymer cement cured layer 2 on a side facing a structure 21; and a resin layer 3 on the polymer cement cured layer 2. The polymer cement cured layer 2 and the resin layer 3 may each consist of a single layer or a stack of layers. Depending on the required performance, another layer may be provided between the polymer cement cured layer 2 and the resin layer 3.

The structure protection sheet 1 of the present invention has a water vapor transmission rate of 10 to 50 $g/m^2 \cdot day$. It is typically presumed that the polymer cement cured layer 2 containing a cement component can be expected to have a certain degree of water vapor transmission rate but the resin layer 3 on the polymer cement cured layer 2 has a lower water vapor transmission rate. In the present invention, however, this is not the case. Since the structure protection sheet 1 as a whole has a water vapor transmission rate within a predetermined range, water vapor inside the structure such as concrete can favorably transmit the sheet to be emitted to the outside after placement of the sheet. Accordingly, swelling can be favorably prevented, and moreover, a decrease in attachability can be prevented. An advantage of the water vapor transmission rate being within the predetermined range is that corrosion of a metal (for example, a reinforcing steel) in a structure tends to be suppressed owing to the structure of the sheet easily releasing vapor. When the structure protection sheet 1 is applied to a structure on a rainy day, the surface of the structure is wet and the structure itself contains moisture. Since the structure protection sheet 1 has the above-described water vapor transmission rate, moisture permeating into the structure easily escapes to the outside after the construction (after production of a reinforced structure). Moreover, concrete immediately after curing contains a large amount of moisture inside, and the structure protection sheet 1 of the present invention can be suitably used for such concrete.

Another advantage of the structure protection sheet 1 of the present invention is that it can be attached to a surface of a structure even in a state where the cement of the structure is not cured, for example, because the water vapor transmission rate thereof can be controlled. Specifically, rapid escape of moisture during molding and curing of cement tends to make the cement porous to decrease the strength of the structure. Attachment of the structure protection sheet 1 of the present invention to the cement before curing can control, for example, the speed of moisture removal during curing of the cement, advantageously avoiding the porous structure.

When the water vapor transmission rate is lower than 10 $g/m^2 \cdot day$, the structure protection sheet 1 of the present invention cannot sufficiently transmit water vapor to fail to prevent a swelling phenomenon or the like after being attached to a structure, resulting in insufficient attachability. When the water vapor transmission rate is higher than 50 $g/m^2 \cdot day$, the speed of removing moisture during curing of the cement becomes excessively high, possibly causing the porous structure of the cured cement. The water vapor transmission rate is preferably within a range of 20 to 50 $g/m^2 \cdot day$.

The structure protection sheet 1 of the present invention having such a water vapor transmission rate can be obtained, for example, by using the polymer cement cured layer 2 described later and a resin having a predetermined water vapor transmission rate for the resin layer 3.

The water vapor transmission rate in the present invention can be measured by a method described later.

The structure protection sheet 1 of the present invention preferably has a sulfuric acid penetration depth of 0.1 mm or less after being immersed in a 5% sulfuric acid aqueous solution for 30 days in a state of covering a building concrete basic block. When the sulfuric acid penetration depth exceeds 0.1 mm, the structure protection sheet 1 of the present invention has insufficient sulfuric acid resistance, and may not be used for structures in which corrosion due to sulfuric acid occurs, such as sewerage concrete structures. The upper limit of the sulfuric acid penetration depth is more preferably 0.01 mm.

The sulfuric acid penetration depth in the present invention can be measured by the method in EXAMPLES described later.

The structure protection sheet of the present invention may be used in a state of a stack including two or more sheets. The structure protection sheet of the present invention can be attached to a structure already protected with the structure protection sheet of the present invention for further protection. Therefore, when two structure protection sheets of the present invention are attached side by side, for example, another sheet of the structure protection sheet of the present invention can be attached so as to cover the boundary between these structure protection sheets.

Since the structure protection sheet of the present invention includes the polymer cement cured layer containing cement and a resin component, the structure protection sheet exhibits favorable attachability to the resin layer of the structure protection sheet of the present invention previously attached to a structure. Therefore, the structure protection sheet of the present invention can be suitably used in a state of a stack including multiple sheets.

The structure protection sheet of the present invention preferably has a tear load of 3 to 20 N as measured in conformity with the description in the article regarding the tear load test in JIS K 6781. Having a tear load within such a range, the structure protection sheet is appropriately torn when collapse of destruction of the protected structure occurs, preventing collapse or destruction in a chain reaction manner. In addition, even in the case where it is necessary to remove only a part of the protected structure, the structure protection sheet can be torn at an arbitrary site, so that the part of the structure can be removed. When the tear load is less than 3 N, protection of a structure itself may be difficult. When the tear load exceeds 20 N, tearing may not occur at an appropriate timing. The tear load is more preferably within a range of 5 to 15 N.

The tear load in the present invention can be measured by the method in EXAMPLES described later.

The structure protection sheet 1 of the present invention preferably has a thickness distribution within ±100 μm. The structure protection sheet 1 has a thickness distribution within the above range, allowing even not a skilled worker to stably place a layer with no or small thickness variation on a surface of the structure 21. Controlling the thickness distribution within the above range facilitates uniform reinforcement of a structure.

The polymer cement cured layer 2 on a side facing the structure 21 is excellent in adhesion to the structure 21 and the like. The resin layer 3 on the polymer cement cured layer 2 has a predetermined water vapor transmission rate, while easily imparting excellent properties such as waterproofness, resistance to salt permeation, and inhibition of neutralization.

Furthermore, the structure protection sheet 1 can be mass-produced in a production line including coating and drying in a factory, thereby achieving low cost, dramatic reduction in the work period at a construction site, and long-term protection of structures. Therefore, the structure protection sheet 1 can not only dramatically reduce a construction period to be attached to a surface of the structure 21 but also protect the structure 21 for a long time.

Specific examples of each structural element are described below.

(Structure)

The structure 21 is a mating member to which the structure protection sheet 1 of the present invention is attached.

Examples of the structure 21 include structures made of concrete.

Concrete is generally obtained by casting and curing a cement composition at least containing a cement-based inorganic substance, an aggregate, an admixture, and water. Such concrete is widely used as: civil engineering structures, including road bridges, tunnels, river management facilities such as sluice gates, sewer pipes, harbor quays, bridges, balustrades, side walls of highways, sewers (inner surfaces, outer surfaces, joints), sewerage facilities (sewerage treatment facilities, canals), underwater facilities, tunnels for wiring in areas near the sea, dam discharge channels, and manhole inner wall surfaces; and architectural structures, including concrete roofs, galvanized-iron roofs, concrete rooftops, construction piping, ALC panels, indoor floor materials, and inner and outer surfaces of chimneys. In the present invention, the structure protection sheet 1 is applied to the structure 21 made of concrete, thereby achieving marked advantages such as conformity to cracks or swelling of the concrete, prevention of entry of water or degradation factors such as chloride ion into the concrete, and emission of moisture in the concrete as water vapor.

(Polymer Cement Cured Layer)

As illustrated in FIG. 3(c), the polymer cement cured layer 2 is present on a side facing a structure. For example, the polymer cement cured layer 2 may be a single layer formed without repeating coating as illustrated in FIG. 1(A) or a stack of layers formed by repeating coating as illustrated in FIG. 1(B). Whether the layer should be a single layer or a stack of layers may be optionally determined in consideration of the thickness of the entire sheet, functions to impart (conformity, attachability to a structure, etc.), production line in a factory, production cost, etc. For example, when the production line is too short to form a single layer having a prescribed thickness, the layer may be formed by repeating coating twice or more. For example, in the repeat coating for two layers, the second layer is formed after the first layer is dried.

The polymer cement cured layer 2 may have a structure in which layers having different characteristics are stacked. For example, formation of a layer having a higher proportion of a resin component on a side facing the resin layer 3 enables the layer having a high resin component content to adhere to the resin layer and a layer having a high cement component content to adhere to a concrete structure, so that the attachability to both becomes extremely excellent.

The polymer cement cured layer 2 is preferably a layer containing a cement component and a resin. Specifically, the polymer cement cured layer 2 is obtainable by applying a coating composition that is prepared by processing a cement component-containing resin (resin component) into a coating composition.

Examples of the cement component include various types of cement, limestones containing calcium oxide components, and clays containing silicon dioxide. Cement is preferred among these. Preferred examples of the cement include Portland cement, alumina cement, high-early-strength cement, and fly ash cement. The cement is selected according to the properties that the polymer cement cured layer 2 should have. For example, the cement is selected in consideration of the degree of conformity to the concrete structure 21. In particular, Portland cement stipulated in JIS R5210 is preferred.

Examples of the resin component include acrylic resin, acrylic urethane resin, acrylic silicone resin, fluororesin, flexible epoxy resins, polybutadiene rubbers, and acrylic resin exhibiting rubber characteristics (for example, synthetic rubber containing an acrylic acid ester as a main component). The resin component is preferably the same as the resin component constituting the resin layer 3 described later to increase the adhesion between the polymer cement cured layer 2 and the resin layer 3.

The resin component used may be any of a thermoplastic resin, a thermosetting resin, and a photocurable resin. The term "cured" of the polymer cement cured layer 2 does not mean that the resin component is limited to a resin that is cured and polymerized, such as a thermosetting resin or a photocurable resin, but means that a material that is cured when the layer is finally formed may be used.

The amount of the resin component is appropriately adjusted according to the materials used and the like. The amount is preferably 10% by weight or more and 40% by weight or less relative to the total amount of the cement component and the resin component. When the amount is less than 10% by weight, the attachability to the resin layer 3 tends to be lowered or the maintenance of the polymer cement cured layer 2 as a layer tends to be difficult. When the amount is more than 40% by weight, the attachability to the concrete structure 21 may be insufficient. From the above standpoint, the amount of the resin component is more preferably 15% by weight or more and 35% by weight or less, still more preferably 20% by weight or more and 30% by weight or less.

The coating composition to form the polymer cement cured layer 2 is a coating solution prepared by mixing the cement component and the resin component using a solvent. The resin component is preferably an emulsion. For example, an acrylic emulsion is a polymer fine powder prepared by emulsion polymerization of an acrylate monomer or the like using an emulsifier. Preferred examples include an acrylic acid polymer emulsion that is obtainable by polymerizing a monomer or a monomer mixture, containing one or more acrylate and methacrylate, in water containing a surfactant.

The amount of the acrylate or the like in the acrylic emulsion is selected from a range of 20 to 100% by mass, though not limited thereto. The amount of the surfactant is not limited and may be determined as necessary. Still, the surfactant is added in an amount at which an emulsion can be formed.

The polymer cement cured layer 2 is formed by applying the coating solution to a release sheet and then evaporating the solvent (preferably water) by drying. For example, the polymer cement cured layer 2 is formed using a mixed composition of a cement component and an acrylic emulsion as a coating solution. The resin layer 3 may be formed after the polymer cement cured layer 2 is formed on the release sheet. Alternatively, the polymer cement cured layer 2 may be formed after the resin layer 3 is formed on the release sheet. In the case of imparting a design property in the present invention, the structure protection sheet 1 may be produced by, for example, embossing or matting (imparting a pattern of protrusions and depressions) a release sheet, and forming the resin layer 3 (which may be a single layer or a stack of two or more layers) and the polymer cement cured layer 2 (which may be a single layer or a stack of two or more layers) on the release sheet in the stated order to impart a design property to the resin layer 3.

The polymer cement cured layer 2 may have any thickness, and the thickness may be arbitrarily set according to the usage form (civil engineering structures, including road bridges, tunnels, river management facilities such as sluice gates, sewer pipes, harbor quays, bridges, balustrades, side walls of highways, sewers (inner surfaces, outer surfaces, joints), sewerage facilities (sewerage treatment facilities, canals), underwater facilities, tunnels for wiring in areas near the sea, dam discharge channels, and manhole inner wall surfaces; and architectural structures, including concrete roofs, galvanized-iron roofs, concrete rooftops, construction piping, ALC panels, indoor floor materials, and inner and outer surfaces of chimneys), age, shape, etc. of the structure 21. For example, the thicknesses of the polymer cement cured layer 2 may be specifically selected from a range of 0.5 mm to 1.5 mm. In an exemplary embodiment, the polymer cement cured layer 2 having a thickness of 1 mm preferably has a thickness variation of not more than ±100 µm. The thickness accuracy would never be achieved by coating at a construction site and is achievable only by stable coating in a production line in a factory. Even when the thickness is more than 1 mm, the thicknesses variation can be set not more than ±100 µm. When the thickness is less than 1 mm, the thickness variation can be further reduced.

The polymer cement cured layer 2, due to the presence of the cement component, can well transmit water vapor. For example, the water vapor transmission rate is about 20 to 60 $g/m^2 \cdot day$. The cement component is highly compatible with a cement component constituting, for example, concrete and therefore provides excellent adhesion to a surface of the concrete. When an undercoat layer 22 and an adhesive agent 23 are stacked on a surface of the structure 21 in the order illustrated in FIG. 3, the polymer cement cured layer 2 containing a cement component closely adheres to the adhesive agent 23. The polymer cement layer 2 is stretchable. Thus, even if cracks or swelling occurs in the structure 21, the polymer cement cured layer 2 can conform to the changes in the concrete.

(Mesh Layer)

The present invention preferably further includes a mesh layer.

When the structure protection sheet of the present invention is used to repair a large-sized concrete member, such as civil engineering structures including road bridges, tunnels, river management facilities such as sluice gates, sewer pipes, and harbor quays, the structure protection sheet of the present invention itself is required to have sufficient strength (tensile strength, bending strength, hardness, surface strength, punching strength, toughness, etc.; the same shall apply herein below). Including the mesh layer, the structure protection sheet of the present invention can have sufficient strength capable of repairing a large-sized concrete member described above.

Figure 5:
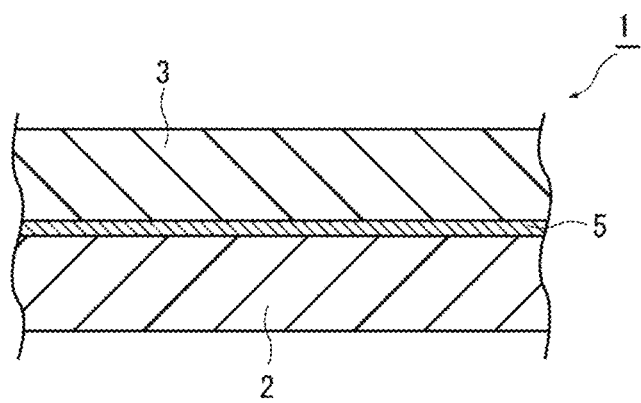
FIG. 5 illustrates cross-sectional structural views showing another example of the structure protection sheet of the present invention.
Figure 5:
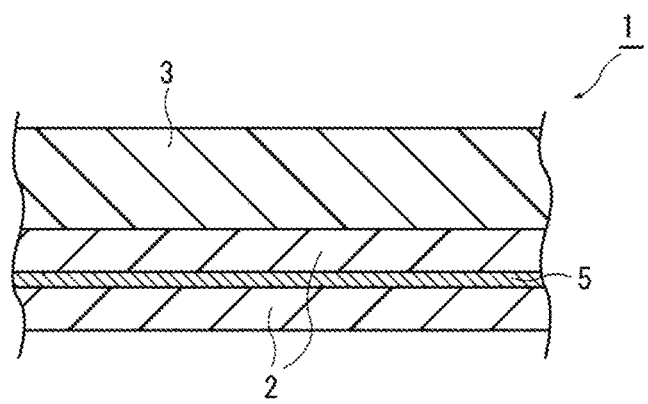

As illustrated in FIG. 5(A), the structure protection sheet 1 of the present invention preferably includes the mesh layer 5 at the interface between the polymer cement cured layer 2 and the resin layer 3 in order to achieve excellent bonding strength.

The bonding strength is determined as follows. The face on the polymer cement cured layer 2 side of the structure protection sheet 1 of the present invention is bonded to a surface of concrete using an adhesive agent, and a tensile jig is fixed to the surface of the resin layer 3. The tensile jig is pulled in the opposite direction from the concrete at a speed of 1500 n/min to measure the strength at which tensile delamination occurs.

As illustrated in FIG. 1(B), the mesh layer 5 may be present inside the polymer cement cured layer 2. The mesh layer 5 may be disposed on the side opposite to the side in contact with the resin layer 3 of the polymer cement cured layer 2. Preferably, the mesh layer 5 is embedded in the polymer cement cured layer 2. When the mesh layer 5 is embedded inside the polymer cement cured layer 2, the contact area between the mesh layer 5 and the polymer cement cured layer 2 increases to easily improve the adhesion strength between them. As a result, the strength of the polymer cement cured layer 2 as a whole is easily secured. When the mesh layer 5 is not embedded inside the polymer cement cured layer 2, separation is likely to occur at the interface between the mesh layer 5 and the polymer cement cured layer 2.

When the mesh layer 5 is present inside the polymer cement cured layer 2, the mesh layer 5 is present at a position of half the thickness of the polymer cement cured layer 2. Preferably, the mesh layer 5 is present closer to the resin layer 3 side. When the mesh layer 5 is present on the resin layer 3 side in the polymer cement cured layer 2, the adhesion force is improved by 1.3 times on average.

In the present invention, the mesh layer 5 is preferably impregnated with a material (for example, a cement component or a resin component) constituting the polymer cement cured layer 2.

The state where the mesh layer 5 is impregnated with the material constituting the polymer cement cured layer 2 means a state where the material constituting the polymer cement cured layer 2 fills the space between the fibers constituting the mesh layer 5, and such an impregnated state makes it easy to obtain particularly excellent adhesion strength between the mesh layer 5 and the polymer cement cured layer 2. Moreover, the interaction between the mesh layer 5 and the material of the polymer cement cured layer 2 tends to be stronger, and the strength of the structure protection sheet 1 tends to be better.

Figure 6:
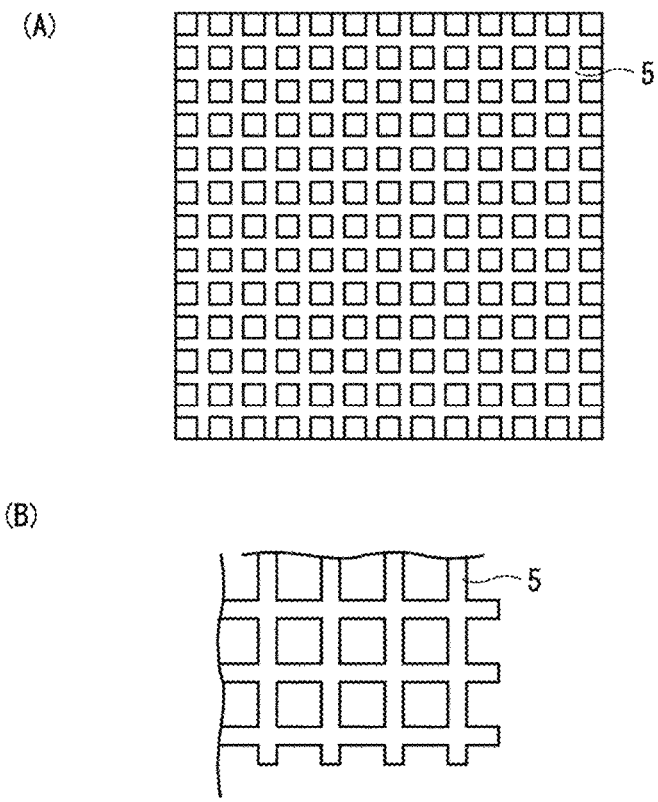
FIG. 6 illustrates schematic views showing one example of the mesh layer of the structure protection sheet of the present invention.

As illustrated in FIG. 6, the mesh layer 5 has a structure in which warp and weft fibers are arranged in a lattice form, for example.

The fibers are preferably composed of at least one type of fiber selected from the group consisting of polypropylene fibers, vinylon fibers, carbon fibers, aramid fibers, glass fibers, polyester fibers, polyethylene fibers, nylon fibers, and acrylic fibers. Among these, polypropylene fibers and vinylon fibers are favorably usable.

The shape of the mesh layer 5 is not limited, and any mesh layer 5 such as a triaxial fabric can be used as well as the biaxial fabric illustrated in FIG. 6.

The mesh layer preferably has a line pitch of 50 mm to 1.2 mm (linear density of 0.2 to 8.0 lines/cm). When the pitch is 1.2 mm or less, the bonding between the polymer cement layers on the upper and lower sides of the mesh becomes insufficient, and the surface strength of the structure protection sheet may become insufficient. In contrast, when the line pitch exceeds 50 mm, there is no adverse effect on the surface strength of the structure protection sheet but the tensile strength may be lowered.

In the structure protection sheet of the present invention, there is a trade-off relation between the tensile strength and the surface strength, and a mesh suitable for the present invention has a line pitch in a range of 50 mm to 1.2 mm.

The mesh layer 5 may have a size that covers the entire surface of the polymer cement cured layer 2 or may be smaller than the polymer cement cured layer 2, when viewed from above the polymer cement cured layer 2.

Namely, the area in a plan view of the mesh layer 5 may be the same as or smaller than the area in a plan view of the polymer cement cured layer 2. Preferably, the area in a plan view of the mesh layer 5 is 60% or more and 95% or less of the area in a plan view of the polymer cement cured layer 2. When it is less than 60%, the strength of the structure protection sheet of the present invention may be insufficient, or the strength may vary. When it exceeds 95%, in the structure in which the polymer cement cured layers 2 are stacked via the mesh layer 5, the adhesion strength between the polymer cement cured layers 3 may be poor. In such a case, when the structure protection sheet of the present invention is attached to a structure, a risk of separation in the polymer cement cured layer 2 portion increases. The area in a plan view of the mesh layer 5 and the like can be measured by a known method.

(Resin Layer)

As illustrated in FIG. 3(C), the resin layer 3 is a layer appearing on the surface on the side opposite to the structure 21. For example, the resin layer 3 may be a single layer as illustrated in FIG. 1(A) or a stack of layers including at least two layers as illustrated in FIG. 1(B). Whether the layer should be a single layer or a stack of layers may be optionally determined in consideration of the thickness of the entire sheet, functions to impart (waterproofness, resistance to salt permeation, inhibition of neutralization, water vapor transmittance, etc.), the length of the production line in a factory, production cost, etc. For example, when the production line is too short to form a single layer having a prescribed thickness, the layer may be formed by repeating coating twice of more. In the repeat coating, a second layer is applied after the first layer is dried. Thereafter, the second layer is dried.

The resin layer 3 is flexible and can conform to cracks or fissures of concrete. The resin layer 3 is obtainable by applying a coating composition that can form a resin layer excellent in waterproofness, resistance to salt permeation, inhibition of neutralization, and water vapor transmittance. Examples of the resin constituting the resin layer 3 include an acrylic resin having characteristics of rubber (for example, synthetic rubber containing an acrylic acid ester as a main component), acrylic urethane resin, acrylic silicone resin, fluororesin, flexible epoxy resin, and polybutadiene rubber. The resin material is preferably the same as the above-mentioned resin component constituting the polymer cement cured layer 2. Preferably, it is a resin containing a component capable of forming an elastic film such as rubber.

In particular, the acrylic resin having the characteristics of rubber preferably includes an aqueous emulsion of an acrylic rubber copolymer because it is excellent in safety and coatability. The acrylic rubber copolymer content of the emulsion is, for example, 30 to 70% by mass. For example, the acrylic rubber copolymer emulsion is obtainable by emulsion polymerization of a monomer in the presence of a surfactant. The surfactant may be any of anionic, nonionic, and cationic surfactants.

The resin layer 3 in the structure protection sheet of the present invention is preferably composed of a resin showing an excellent water vapor transmission rate. The presence of the resin layer 3 composed of such a resin can set the water vapor transmission rate of the structure protection sheet of the present invention within the above-described range.

The coating composition to form the resin layer 3 is a mixed coating solution of a resin composition and a solvent. The resin layer 3 is formed by applying the coating solution to a release sheet, and then evaporating the solvent by drying. The solvent may be water or an aqueous medium. Alternatively, the solvent may be an organic solvent such as xylene or a mineral spirit. In the examples described later, an aqueous medium is used, and the resin layer 3 is prepared using an acrylic rubber composition. The layers may be formed in any order on a release sheet. For example, they may be formed in the order of the resin layer 3 and the polymer cement cured layer 2 as described above, or in the order of the polymer cement cured layer 2 and the resin layer 3.

The thickness of the resin layer 3 is not limited and may be optionally determined according to the usage form (civil engineering structures, including road bridges, tunnels, river management facilities such as sluice gates, sewer pipes, and harbor quays), age, shape, etc. of the structure 21. For example, the thickness may be selected from a range of 50 to 150 µm, and the thickness variation is preferably not more than ±50 µm. The thickness accuracy would never be achieved by application at a construction site but is achievable in a production line in a factory.

The resin layer 3 has high waterproofness, resistance to salt permeation, and inhibition of neutralization and preferably transmits water vapor. The water vapor transmission rate of the resin layer 3 is preferably appropriately adjusted so that the structure protection sheet 1 of the present invention has a water vapor transmission rate of 10 to 50 g/m$^2$·day, for example. The resin layer 3 having such a water vapor transmission rate can impart high waterproofness, resistance to salt permeation, inhibition of neutralization, and a prescribed water vapor transmittance to the structure protection sheet 1. Moreover, the resin layer 3 including the same resin component as one in the polymer cement cured layer 2 is highly compatible with the polymer cement cured layer 2 and has excellent adhesion. The water vapor transmittance is measured in accordance with "Testing Methods for Determination of the Water Vapor Transmission Rate of Moisture Proof Packaging Materials" stipulated in JIS Z0208.

The resin layer 3 may contain a pigment in order to enrich the color variation of the structure protection sheet 1 of the present invention.

The resin layer 3 may contain an inorganic substance. The resin layer 3 containing an inorganic substance can have scratch resistance. Any inorganic substance may be used, and examples thereof include conventionally known materials such as metal oxide particles of silica, alumina, titania, and the like.

The structure protection sheet of the present invention preferably has a contamination removal rate of 95% or higher as measured by contaminating the surface on the side opposite to the side facing the polymer cement cured layer 2 of the resin layer 3 with carbon particle-containing oil, placing the structure protection sheet vertically, and cleaning the contaminated surface with tap water substantially horizontally sprayed vigorously from a hose from a position about two meters away. The resin layer 3 has excellent surface cleanability, and therefore the structure protection sheet of the present invention can be used as a repair sheet particularly suitable for structures to which contaminants easily adhere, such as highway walls and tunnel wall surfaces. When the contamination removal rate is lower than 95%, the antifouling properties become insufficient, and the structure protection sheet on the highway walls or tunnel wall surfaces as described above is likely to give an sensory impression of "being dirty". The contamination removal rate is preferably as high as possible, but is usually 98% or lower.

The structure protection sheet 1 of the present invention having such a contamination removal rate is obtainable by, for example, selecting a material that easily removes contaminants such as acrylic silicone resin as the resin used for the resin layer, or allowing the resin layer to contain a material (antifouling agent) that easily removes contaminants such as silicon resin or silicon fine particles.

The evaluation of contamination in the present invention can be carried out by the method in EXAMPLES described later.

The resin layer 3 may contain additives capable of imparting various functions. Examples of such additives include cellulose nanofibers and the like.

[Design Imparting Treatment]

The structure protection sheet of the present invention preferably has a design property on either one side of the resin layer 3. The "either one side" herein means a face on the side facing the polymer cement cured layer 2 or a face on the opposite side. The design property is preferably imparted by providing a pattern of protrusions and depressions or printing. The design property may be imparted by any treatment, and suitable examples thereof include: embossing treatment, matting treatment (matte treatment), and mirror treatment (gloss treatment) on a surface of the resin layer; and printing on a surface of the resin layer.

Figure 7:
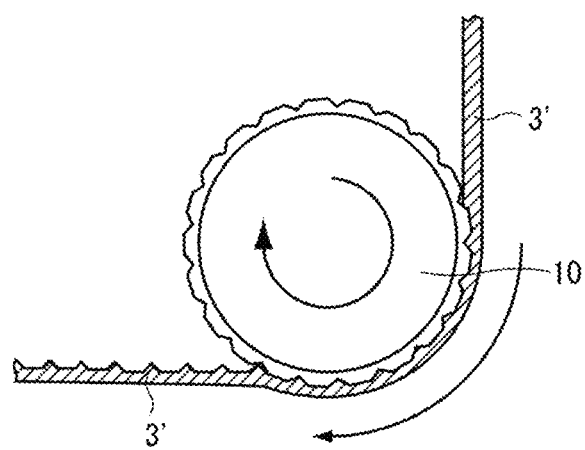
FIG. 7 illustrates a schematic view showing one example of embossing treatment performed on the resin layer of the structure protection sheet of the present invention.

The embossing treatment imparts a desired pattern of protrusions and depressions to a surface of the resin layer 3. Examples of the embossing treatment include a method including feeding an uncured resin layer 3' to an embossing roll 10 having, on its roll surface, a pattern of protrusions and depressions corresponding to that to be imparted as illustrated in FIG. 7, pressing a surface of the uncured resin layer 3' against the embossing roll 10 to transfer the pattern of protrusions and depressions on the embossing roll 10 to the surface of the uncured resin layer 3', and curing the uncured resin layer 3' to form the resin layer 3.

The pattern of protrusions and depressions on the embossing roll is not limited and may be appropriately selected according to a desired design.

Other conditions for the embossing treatment may be conventionally known conditions for the embossing treatment on resin films.

The method of forming a pattern of protrusions and depressions on a surface of the resin layer 3 is not limited to the embossing treatment, and other methods may be used. For example, it may be formed by so-called matting treatment by a method similar to the embossing treatment.

Figure 8:
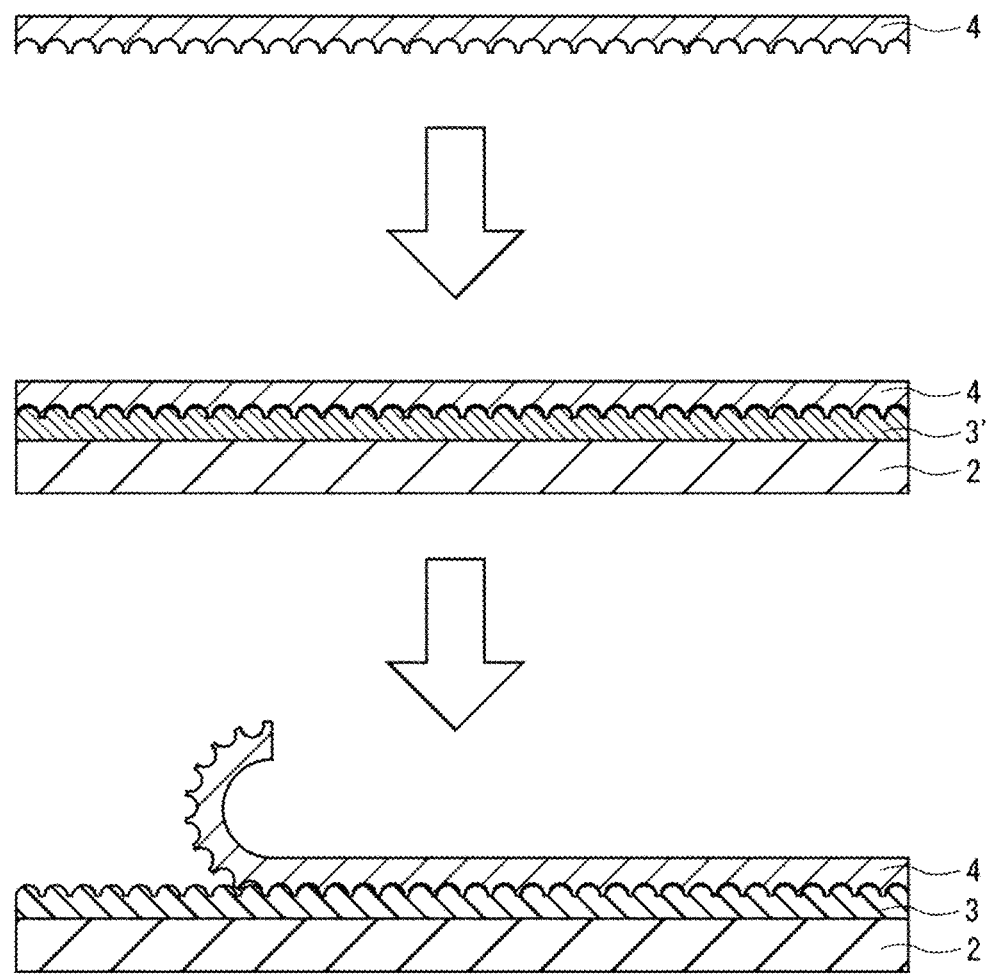
FIG. 8 illustrates an explanatory view of a method of forming a pattern of protrusions and depressions on a resin layer of a structure protection sheet.

For example, as illustrated in FIG. 8, a dimpled (hemispherical) pattern with a depth of about 1 micron is provided on the release layer 4, the uncured resin layer 3' is applied thereon, the resin in the uncured resin layer 3' is cured, and the polymer cement layer 2 is provided, followed by peeling of the release layer 4. Thus, a structure protection sheet having a matted design on a surface of the resin layer 3 can be obtained.

The printing on a surface of the resin layer 3 may be performed by any method. For example, printing may be performed using an ink obtained by blending a solvent, a binder resin (urethane resin, acrylic resin, nitrocellulose resin, rubber resin, etc.), various pigments, extender pigments, and additives (plasticizers, drying agents, stabilizers, etc.).

Any pattern or the like may be printed, and a character, a picture, or the like is appropriately selected according to the design to be imparted to the structure.

Examples of the printing method using the ink include known printing methods such as offset printing, gravure printing, flexographic printing, silk screen printing, and inkjet printing.

In order to improve adhesion of the ink to the resin layer 3, the surface of the resin layer 3 may be subjected to treatment such as corona treatment or ozone treatment before printing with the ink.

The structure protection sheet of the present invention can be formed, for example, by providing an embossed or matted face with protrusions and depressions on a surface of a release sheet, forming a design on the face with protrusions and depressions by printing, and further providing a resin layer and a polymer cement layer thereon in the stated order.

It is also preferable to interpose a transparent resin layer such as an acrylic silicone layer at the interface between the release sheet and the face with protrusions and depressions.

In this case, since a resin layer of acrylic silicon or the like is present on the outermost surface after protection of a structure, the weather resistance is greatly improved.

The design property is imparted to at least one side of the resin layer 3. For example, when the design property is imparted to the side opposite to the side facing the polymer cement cured layer 2 of the resin layer 3 (the face to be the front face of the structure protection sheet 1 or the surface of the resin layer 3 in contact with the release sheet), the design property imparted is more favorable. In particular, when a pattern of protrusions and depressions is formed by embossing or the like, the design property excellent in 3D effect can be imparted.

When the design property is imparted to the surface on the side facing the polymer cement cured layer 2 of the resin layer 3, the design property is kept excellent for a long time because the imparted design does not come into direct contact with the outside air. When embossing treatment is performed, the surface of the resin layer 3 is flat while having a 3D design. In this case, the resin layer 3 may be formed to be transparent or semitransparent.

Moreover, the structure protection sheet of the present invention suitably has a structure in which a printed layer is provided on the surface on the side facing the polymer cement cured layer 2 of the resin layer 3 and a pattern of protrusions and depressions is provided by embossing treatment or the like on the surface on the opposite side of the resin layer 3. This structure simultaneously achieves an excellent design property by a printed layer and a 3D effect by the pattern of protrusions and depressions formed by embossing treatment, and can impart functions such as antiglare properties, soundproof properties, and antifouling properties owing to the pattern of protrusions and depressions.

Figure 2:
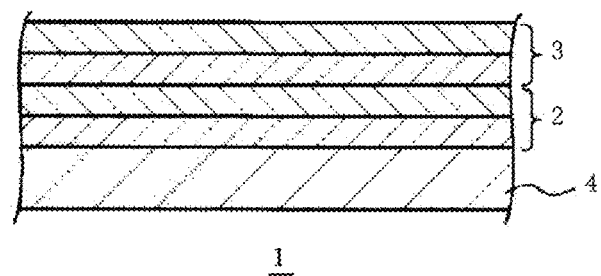
FIG. 2 illustrates cross-sectional structural views showing another example of the structure protection sheet of the present invention.
Figure 2:
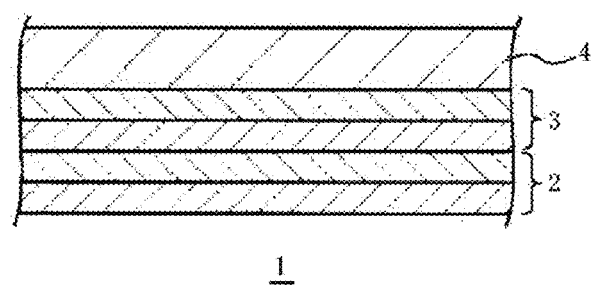

As illustrated in FIG. 2, the produced structure protection sheet 1 may have the release sheet 4 on a face of either the polymer cement cured layer 2 or the resin layer 3. The release sheet 4 can protect a surface of the structure protection sheet 1 during transfer to a construction site, for example. At the construction site, the structure protection sheet 1 is attached to a target structure 21 (optionally via an undercoat layer 22 or an adhesive layer 23) together with the release sheet 4, and then the release sheet 4 is peeled off, thereby greatly improving workability at the construction site. Preferably, the release sheet 4 is a processing paper used in a production process of the structure protection sheet 1.

The material or the like of the processing paper used as the release sheet 4 may be any known material used in production processes. Examples include lamination paper including a layer of olefin resin such as polypropylene or polyethylene or a silicon-containing layer, like known processing papers. The thickness of the processing paper is not limited. For example, the thickness may be within a range of about 50 to about 500 μm, provided that the thickness does not hinder the production, construction, and handling.

The structure protection sheet 1 described above can emit moisture in a structure such as concrete and can protect the concrete structure 21 for a long time. Specifically, the structure protection sheet 1 is provided with functions appropriate for the properties of the concrete structure 21, thereby achieving conformity to cracks or swelling of the concrete structure 21, prevention of entry of water or degradation factors such as chloride ion into the concrete structure 21, and transmittance allowing for emission of moisture or degradation factors from the concrete structure 21. The structure protection sheet 1 can be produced in a factory, enabling mass production of high quality products with stable properties. Thus, construction can be carried out even without craftsman's skill, and thus reduction of a construction period and labor cost cut can be achieved.

The structure protection sheet of the present invention can be used for various applications in addition to the above-mentioned surface reinforcement of civil engineering structures such as road bridges, tunnels, river management facilities such as sluice gates, sewer pipes, harbor quays, bridges, and balustrades, and various effects can be obtained. Specific applications include attachment to metal roofs such as galvanized-iron roofs to impart metal corrosion resistance, attachment to pipes for buildings to reinforce the surface, attachment to ALC panels for factory buildings or the like to reduce degradation or for repair, attachment to side walls of highways to impart contamination resistance, prevent reflection by means of the surface shape, and provide information, attachment to sewer pipes (inner surfaces, outer surfaces, joints) to impart sulfuric acid resistance, attachment to outdoor/indoor floors and concrete rooftops to improve the strength, attachment to underwater facilities to improve the durability, attachment to tunnels for wiring in the area near the sea to reinforce the surface, attachment to dam discharge channels to prevent degradation or for repair of degraded portions, attachment to civil engineering structures such as manhole inner walls, concrete roofs, concrete rooftops, indoor floor materials made of stone or resin, architectural structures such as inner and outer surfaces of chimneys, and building materials for dwelling houses to impart moss preventability and antifungal properties, attachment to inner and outer surfaces of chimneys to reinforce the surface, and attachment to manhole inner walls to prevent degradation or for repair.

Polyrotaxane may be added to modify the structure protection sheet of the present invention. Also, a resin composition or particles may be added to improve the surface strength of the structure protection sheet of the present invention.

[Concrete Block]

The concrete block of the present invention is obtainable by attaching the polymer cement cured layer of the structure protection sheet of the present invention to a surface of a concrete block via an adhesive layer.

The adhesive agent constituting the adhesive layer may be any adhesive agent, and examples thereof include the same adhesive agents as those described below.

An undercoat layer described below may be provided on the concrete block before the adhesive layer is formed.

The concrete block to which the structure protection sheet of the present invention is attached may be any concrete block, and examples thereof include those having an arbitrary shape according to the intended use. Specifically, examples include inner walls of tunnels, median strips of highways, bridges, sewer pipes, foundations of dwelling houses, or the like, and objects are diverse in the field of civil engineering and construction.

The concrete block of the present invention as above has the above-described structure protection sheet of the present invention attached to its surface, and therefore has excellent water vapor transmittance to suppress swelling or a decrease in adhesive strength due to moisture in the concrete block.

[Method for Producing Reinforced Structure Using Structure Protection Sheet]

Figure 3:
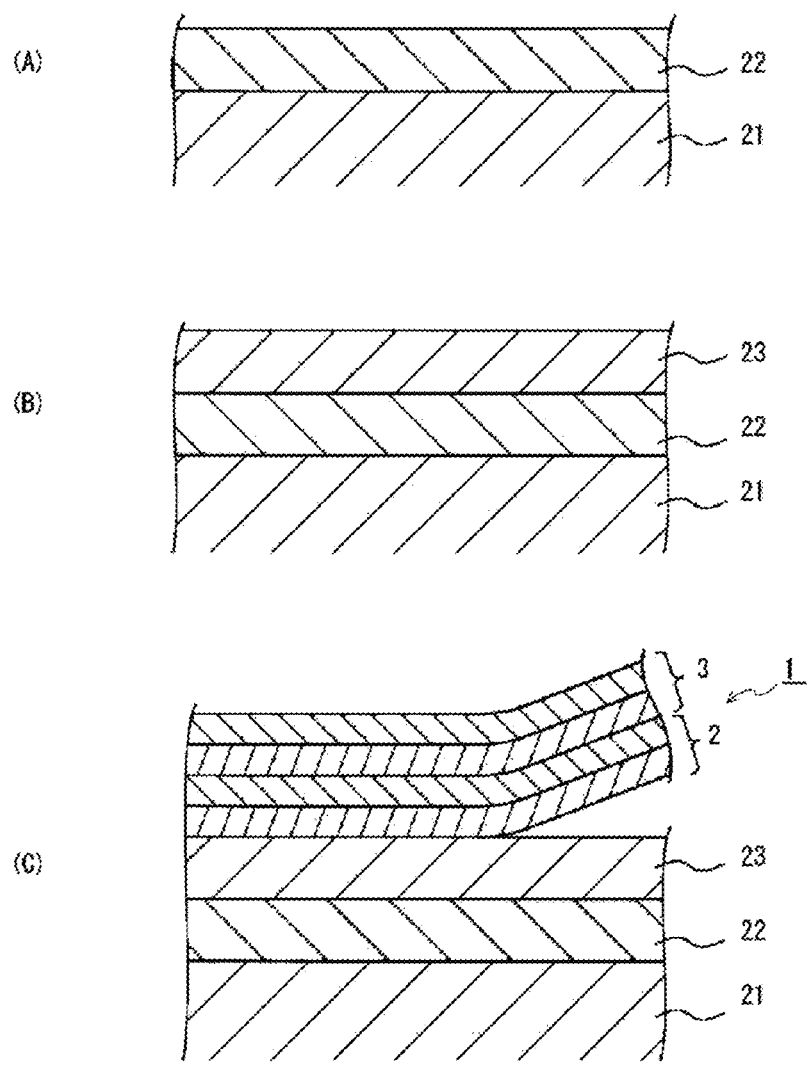
FIG. 3 illustrates explanatory views showing a construction method using a structure protection sheet.

As illustrated in FIG. 3, the method for producing a reinforced structure using a structure protection sheet of the present invention uses the structure protection sheet 1 of the present invention. The method includes applying the adhesive agent 23 to the structure 21 and then attaching the structure protection sheet 1. The construction method enables easy attachment of the structure protection sheet 1 to a surface of the structure 21, allowing even not a skilled worker to place the structure protection sheet 1 on a surface of the structure 21. The method can not only dramatically reduce a construction period but also protect the structure 21 for a long time.

FIG. 3 illustrates explanatory views showing a construction method using the structure protection sheet 1 (method for producing a reinforced structure). As illustrated in FIG.

3(A), the undercoat layer 22 is preferably formed on a surface of the structure 21 in the construction. The undercoat layer 22 may be formed by mixing a resin such as an epoxy resin with a solvent to prepare a coating solution, applying the coating solution to the structure 21, and then evaporating the solvent in the coating solution by drying. Examples of the solvent include water and the like described above. The thickness of the undercoat layer 22 is not limited and may be, for example, in a range of 100 to 150 µm. The adhesion between the structure 21 and the adhesive agent 23 is increased by the undercoat layer 22 placed between them. Thus, the structure protection sheet 1 can stably protect the structure 21 for a long time. If the structure 21 has cracks or defective parts, the undercoat layer 22 is preferably placed after the cracks or defective parts are repaired. The repair is not limited. Usually, cement mortar, an epoxy resin, or the like is used.

After the formation of the undercoat layer 22, the adhesive agent 23 is applied as illustrated in FIG. 3(B). As illustrated in FIG. 3(C), the structure protection sheet 1 is attached to the applied adhesive agent 23 that is not dried. Examples of the adhesive agent 23 include urethane adhesive agents, epoxy adhesive agents, and adhesive agents containing acrylic resins having characteristics of rubber (e.g., synthetic rubber containing an acrylate as a main component). The adhesive agent 23 more preferably contains the resin component that constitutes the polymer cement cured layer 2 in the structure protection sheet 1 so as to increase the adhesive strength to the polymer cement cured layer 2. The thickness of the adhesive agent 23 is not limited. The adhesive agent 23 is usually applied to concrete by brush coating, spraying, or the like and is then cured by natural drying with time.

Figure 4:
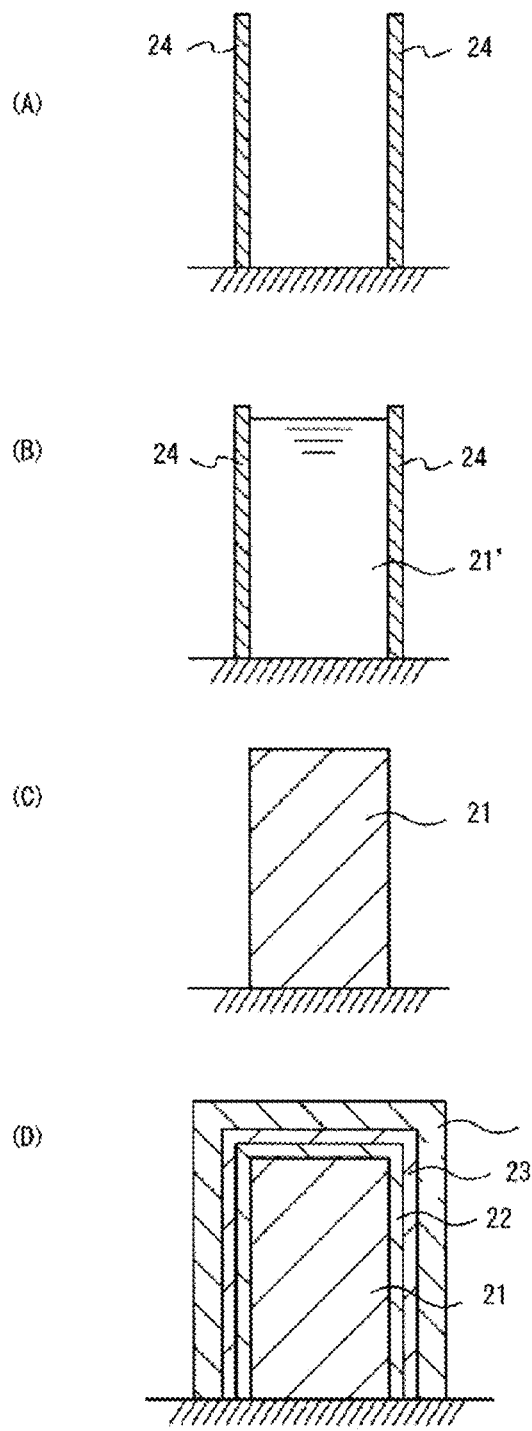
FIG. 4 illustrates explanatory views showing an example in which a structure protection sheet is used in the cast-in-place method.

FIG. 4 illustrates explanatory views showing an example in which the structure protection sheet 1 is used in the cast-in-place method. The cast-in-place method refers to a construction method including: forming a molding frame 24 at a construction site; pouring a concrete composition 21' into the molding frame 24; and leaving it until it is cured, thereby producing the concrete structure 21. In the cast-in-place method, the structure protection sheet 1 attached to a surface of the cured concrete structure 21 makes the structure 21 to be less susceptible to degradation. The attachment is carried out by coating a surface of the concrete structure 21 with the undercoat layer 22, followed by drying; applying the adhesive agent 23 to the undercoat layer 22, and attaching the structure protection sheet 1. Next, the adhesive agent 23 is cured by natural drying, so that the structure protection sheet is adhered.

If the structure 21 already has cracks or the like, the structure protection sheet 1 is attached by the construction method described above after the defective parts are repaired. Thus, the concrete structure 21 can obtain a longer life.

Figure 10:
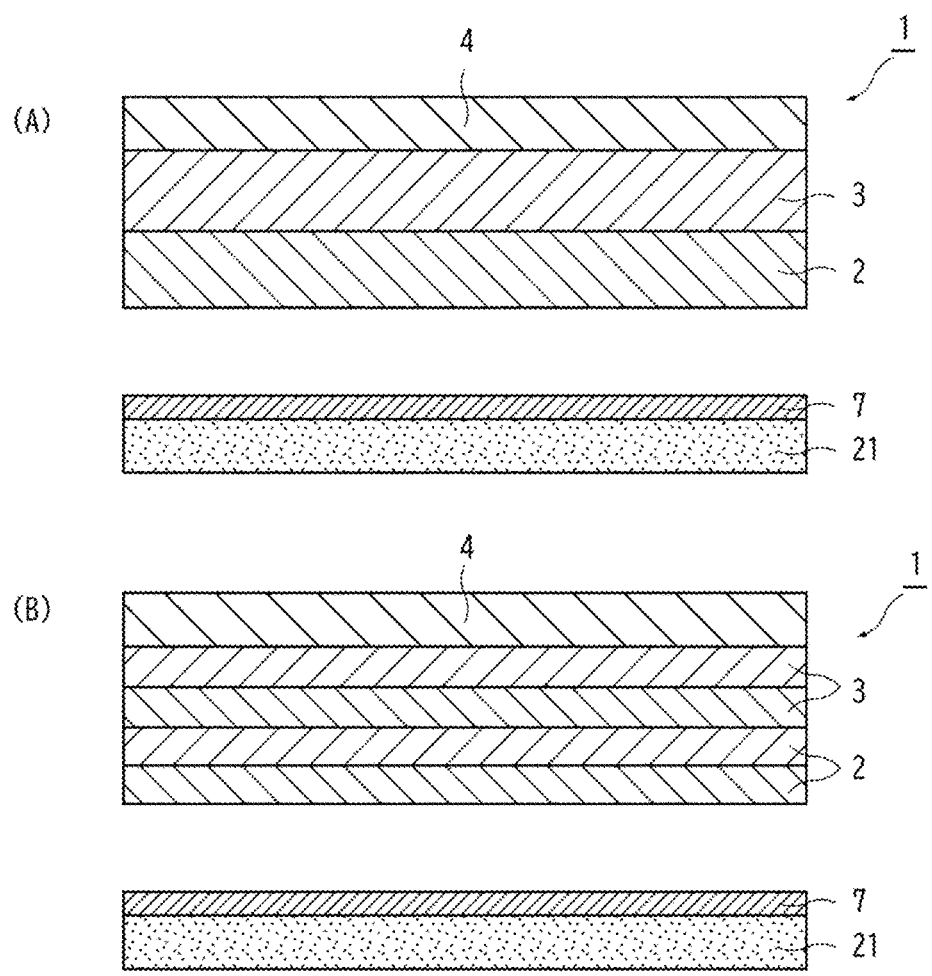
FIG. 10 illustrates cross-sectional structural views showing another example of the structure protection sheet of the present invention.
Figure 11:
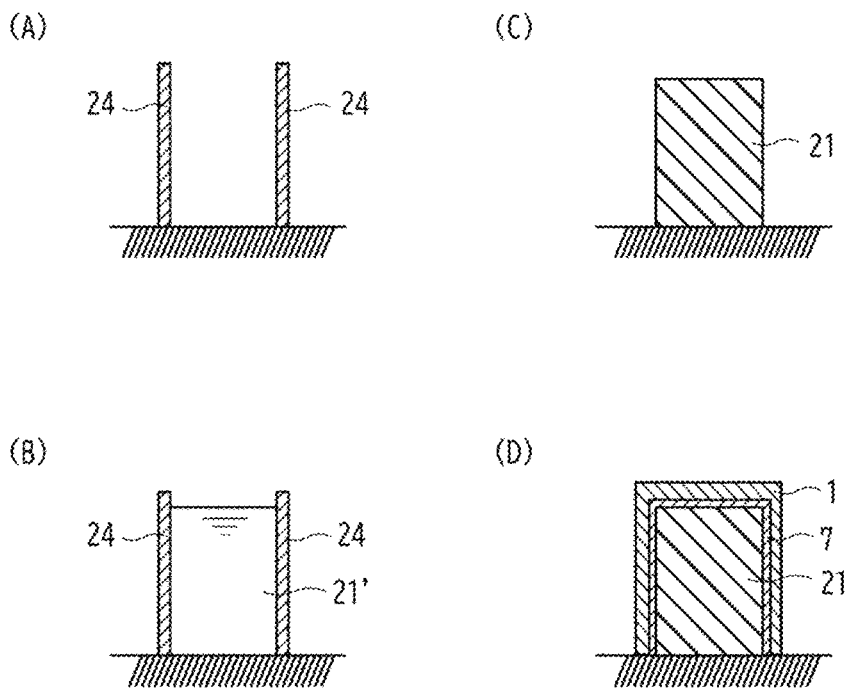
FIG. 11 illustrates explanatory views showing another example in which the structure protection sheet is used in the cast-in-place method.

As illustrated in FIG. 10, the method for producing a reinforced concrete structure of the present invention may include:
(1) applying a primer layer 7 containing a curable resin material to a surface of the concrete structure 21;
(2) placing the structure protection sheet 1 on the primer layer 7 in a manner that the primer layer 7 and the polymer cement cured layer 2 are brought into contact with each other; and
(3) curing the primer layer 7 to form a cured primer layer. Each step will be described below.

[Step (1)]
(Structure)
The concrete structure 21 is a mating member to which the structure protection sheet 1 of the present invention is attached, and examples thereof include the same ones as those described above.
[Primer Layer 7]
In step (1), the primer layer 7 containing a curable resin material is applied to a surface of the concrete structure 21.

The curable resin material may be any resin material that is cured by thermal curing, photo-curing, or other methods. Preferred examples thereof include an epoxy compound. In this case, a cured primer layer (not illustrated in FIG. 10) formed by curing the primer layer 7 is an epoxy cured product. The epoxy cured product is generally obtained by curing an epoxy compound containing two or more epoxy groups with a curing agent. Hereinafter, a case where an epoxy cured product is used for a primer layer will be described as an example.

Examples of the epoxy compound include bisphenol A type epoxy resins, bisphenol F type epoxy resins, bisphenol S type epoxy resins, o-cresol novolac type epoxy resins, alicyclic epoxy resins, aliphatic epoxy resins, diglycidyl etherified products of phenols, and diglycidyl etherified products of alcohols.

Examples of the curing agent include polyfunctional phenols, amines, polyamines, mercaptans, imidazoles, acid anhydrides, and phosphorus-containing compounds. Among these, examples of the polyfunctional phenols include hydroquinone, resorcinol, and catechol which are monocyclic bifunctional phenols, bisphenol A, bisphenol F, naphthalenediols, and biphenols which are polycyclic bifunctional phenols, and halides and alkyl group-substituted products thereof. Further, novolak and resol which are polycondensation products of these phenols and aldehydes can be used. Examples of the amines include aliphatic or aromatic primary amines, secondary amines, tertiary amines, and quaternary ammonium salts, aliphatic cyclic amines, guanidines, and urea derivatives.

Among the examples mentioned above, examples of the material (including a curable resin material) of the primer layer 7 include an epoxy resin primer containing, for example, a bisphenol A-type epoxy or bisphenol F-type epoxy base compound and a polyamine or mercaptan curing agent. The epoxy resin primer may contain, for example, a coupling agent, a viscosity modifier, and a curing accelerator in addition to the base compound and the curing agent. As such a primer layer 7, for example, a two component reaction-curable aqueous epoxy resin emulsion "ARON-BULLCOAT P-300" (trade name; "ARONBULLCOAT" is a registered trademark of Toagosei Co., Ltd.) available from Toagosei Co., Ltd. can be used.

The primer layer 7 is generally used as an undercoating material for the concrete structure 21. For example, an undercoating material such as a solvent-type epoxy resin solvent solution, an epoxy resin emulsion and other general emulsions, or an adhesive agent is applied to a surface of the concrete structure 21. In this case, the undercoating material can be applied by an ordinary method. For example, a coating can be formed by applying the undercoating material to a surface of the concrete structure 21 to be prevented from deteriorating with a brush, a roller, or the like, or by spraying the undercoating material with a spray gun or the like.

The primer layer 7 may have any thickness. Still, the thickness is preferably set within a range of 50 µm or more and 300 µm or less in a wet state. When the thickness is 50 µm or more, the thickness of the primer layer 7 can be easily made uniform in consideration of penetration of the material of the primer layer 7 into the concrete, and adhesion between the concrete structure 21 and the structure protection sheet 1 can be easily secured. The upper limit of the thickness of the primer layer 7 is not limited, but is preferably 300 μm or less from the standpoint of ease of application, minimization of displacement between the layers during adhesion, and optimization of amount of material usage. The adhesion between the concrete structure 21 and the structure protection sheet 1 is increased by the primer layer 7 placed as an undercoat layer of the concrete structure 21. Accordingly, when the primer layer 7 has the above thickness, the structure protection sheet 1 can stably reinforce and protect the concrete structure 21 for a long time.

When cracks or defects occur in the concrete structure 21, the primer layer 7 is preferably provided after the cracks or defects are repaired. The repair method is not limited. Normally, the repair is performed using cement mortar, epoxy resin, or the like.

[Step (2)]

In step (2), the structure protection sheet 1 is placed on the primer layer 7 in a manner that the primer layer 7 and the polymer cement cured layer 2 are brought into contact with each other. The structure protection sheet 1 can be placed, for example, by applying the primer layer 7 to the concrete structure 21 and then bonding the structure protection sheet 1, as illustrated in FIG. 10. As a result, even not a skilled worker can provide the structure protection sheet 1 including layers having a small variation in thickness on the concrete structure 21, which can not only reduce a construction period but also protect the concrete structure 21 for a long time. The primer layer 7 can be applied to a surface of the polymer cement cured layer 2 of the structure protection sheet 1 immediately before bonding, not to the concrete structure 21.

One feature of this embodiment is that the primer layer 7 serving as an undercoat layer can be used as an adhesive layer without using an adhesive agent. Therefore, in the present invention, the structure protection sheet 1 can be directly placed on the primer layer 7 (uncured, wet state), and the process can be shortened.

[Step (3)]

Step (3) includes curing the primer layer 7 to form a cured primer layer (not illustrated in FIG. 10). The primer layer 7 is cured, for example, by leaving the primer layer 7 and the structure protection sheet 1 attached to each other for 24 hours. Curing in the construction in a normal environment advantageously needs no management of temperature, humidity, and the like.

EXAMPLES

The present invention will be described more specifically with reference to examples.

Example 1

A release sheet used included PP lamination paper embossed in advance and had a thickness of 130 μm.

A resin layer was formed on the release sheet by the following method.

First, an emulsion composition was prepared which contained 60 parts by mass of an acrylic silicone resin, 25 parts by mass of titanium dioxide, 10 parts by mass of ferric oxide, and 5 parts by mass of carbon black. This emulsion composition was applied onto the release sheet and then cured by heat treatment to form a resin layer. The resin layer was made to have a thickness of 0.1 mm.

Next, a polymer cement cured layer was formed on the resin layer.

Specifically, an aqueous acrylic emulsion containing 45 parts by mass of a cement mixture was prepared as a composition for forming a polymer cement cured layer. Here, the cement mixture at least contained 70±5 parts by mass of Portland cement, 10±5 parts by mass of silicon dioxide, 2±1 parts by mass of aluminum oxide, and 1 to 2 parts by mass of titanium oxide. The acrylic emulsion at least contained 53±2 parts by mass of an acrylic acid polymer obtained by emulsion polymerization using an acrylate monomer as an emulsifier, and 43±2 parts by mass of water. The polymer cement layer 2 obtained by applying and drying a polymer cement cured layer-forming composition obtained by mixing the mixture and the emulsion is a composite layer in which the acrylic resin has a Portland cement content of 50% by mass.

The polymer cement cured layer-forming composition was applied to the resin layer and dried to form a polymer cement cured layer consisting of a single layer having a thickness of 1.29 mm.

Thus, a structure protection sheet having a total thickness of 1.39 mm was produced. The structure protection sheet was continuously produced in a factory at a controlled temperature of about 25° C. and wound up together with the release sheet 4 into a roll.

[Water Vapor Transmission Rate]

The water vapor transmission rate of the structure protection sheet of Example 1 was measured. The water vapor transmission rate (WVTR) is also known as "moisture permeability". It is an amount in grams of water vapor permeating a 1 $m^2$ film (structure protection sheet 1) per 24 hours, expressed as $g/m^2 \cdot day$ or g/ml/day, and is used as an index of water vapor barrier performance. The measurement was performed in conformity with JIS Z 0208 (B).

The water vapor transmission rate of the structure protection sheet of Example 1 was 30 $g/m^2 \cdot day$. When the structure protection sheet is applied for protection of a concrete structure, a swelling phenomenon caused by a factor inside the concrete does not occur due to the feature of easily releasing water vapor, and the corrosion of metals in the structure tends to be suppressed. In addition, a defect in the concrete shape due to excessively rapid diffusion of moisture inside the concrete does not occur.

[Sulfuric Acid Resistance]

The structure protection sheet of Example 1 was immersed in a 5% sulfuric acid aqueous solution for 30 days in a state of covering a building concrete basic block, and then the sulfuric acid penetration depth was measured.

Specifically, the structure protection sheet of the present invention was immersed in a 5% sulfuric acid aqueous solution for 30 days in a state where a cuboid building concrete basic block was wrapped with the structure protection sheet of the present invention so that all surfaces thereof were covered, and the portion of the building concrete basic block immersed in the aqueous sulfuric acid solution was cut in half. To the cross section was sprayed a 1% phenolphthalein solution. The vertical distance (shortest distance) of the colored portion from the block end was visually measured at any five points using a caliper. The average value was determined as the sulfuric acid penetration depth.

In determination of the sulfuric acid resistance of the structure protection sheet of Example 1, the sulfuric acid penetration depth after 30 days was not visually recognized, and it was confirmed that the structure protection sheet sufficiently endures applications requiring sulfuric acid resistance, such as sewer pipes. [Cleanability (antifouling property)]

The contamination removal rate in the following situation was calculated. The surface on the side opposite to the side facing the polymer cement cured layer of the resin layer of Example 1 was contaminated with carbon particle-containing oil, and then the structure protection sheet was placed vertically. The contaminated surface was cleaned with tap water substantially horizontally sprayed vigorously from a hose from a position about two meters away.

Specifically, to 100 parts by weight of Castrol engine oil EDGE 0W-20 4L total synthetic oil for four wheel gasoline vehicles (available from Castrol Co., Ltd.) was added 5 parts by weight of carbon ECP200L (available from Lion Specialty Chemicals), followed by stirring. Thus, a carbon particle-containing oil was prepared.

The surface on the side opposite to the side facing the polymer cement cured layer of the resin layer of Example 1 was contaminated by applying the above carbon particle-containing oil, and the contaminated surface was fixed so as to be vertical.

Thereafter, tap water was sprayed vigorously to the contaminated surface substantially horizontally from a hose from a position about two meters away, and how the carbon-containing oil was removed was observed.

The evaluation was performed visually.

Among all the contaminated areas, an area where contamination was removed and no contamination was observed was distinguished from an area where contamination was still observed, and the percentage of the area where contamination was removed and no contamination was observed in the whole contaminated area was taken as the removal rate.

The removal rate of the structure protection sheet of Example 1 was 98%, satisfying the cleanability required for tunnel inner walls, median strips of highways, or the like.
[Tear Load]

The tear load of the structure protection sheet of Example 1 was measured in conformity with the article regarding the tear load in JIS K 6781.

The tear load of the structure protection sheet of Example 1 was 13 N. It indicates that the structure protection sheet can be appropriately torn, when collapse or destruction of the protected structure occurs, to limit the separation thereof in a small area, which prevents collapse or destruction accompanying the separation in a large area in a chain reaction manner.

Example 2

A polymer cement cured layer-forming composition prepared in the same manner as in Example 1 was applied to the resin layer to a thickness before drying of 1.0 mm, and a mesh layer having a density of 1.0 lines/cm and a pitch of 10 mm was disposed thereon. Next, a structure protection sheet was produced as in Example 1, except that the polymer cement cured layer-forming composition was further applied onto the mesh layer to a thickness before drying of 1.0 mm, and the applied composition was dried to form a polymer cement cured layer having a thickness of 1.29 mm. The obtained structure protection sheet was wound up into a roll as in Example 1.

[Measurement of Strength]

The strength of the structure protection sheet obtained in Example 2 was evaluated based on the breaking strength measured by a tensile tester (available from Shimadzu Corporation, AGSJ).

As a result of measurement at a width of 50 mm, the strength of Example 2 was 1500 N.
[Measurement of Thickness Variation]

In Example 2, about an A4 size piece (200 mm×300 mm) was cut out from the structure protection sheet roll, the thickness was measured at 14 points, and variations in the thicknesses were calculated. In Example 2, the thickness variation was 26 µm.

Examples 3 to 5

The total thickness of the structure protection sheet of Example 2 was changed. In Example 3, a structure protection sheet having a total thickness of 0.76 mm was produced in which a polymer cement cured layer having a thickness of 0.66 mm and a resin layer having a thickness of 100 µm were laminated. In Example 4, a structure protection sheet having a total thickness of 1.06 mm was produced in which a polymer cement layer having a thickness of 0.96 mm and a resin layer having a thickness of 100 µm were laminated. In Example 5, a structure protection sheet having a total thickness of 1.57 mm was produced in which a polymer cement layer having a thickness of 1.47 mm and a resin layer having a thickness of 100 µm were laminated. Other conditions were the same as those in Example 2.
[Strength and Water Vapor Transmission Rate]

The strength and water vapor transmission rate of Examples 3 to 5 were measured. The strength was evaluated based on the breaking strength measured by a tensile tester (AGS-J, available from Shimadzu Corporation). The water vapor transmission rate (WVTR) is also known as "moisture permeability". It is an amount in grams of water vapor permeating a 1 $m^2$ film (structure protection sheet 1) per 24 hours, expressed as $g/m^2 \cdot day$ or g/ml/day, and is used as an index of water vapor barrier performance. The measurement was performed in conformity with the JIS Z0208 (B) method.

The measurement results at a width of 50 mm were as follows: in Example 3, the strength was 1200 N and the water vapor transmission rate was 18.2 $g/m^2 \cdot day$; in Example 4, the strength was 1500 N and the water vapor transmission rate was 13.0 $g/m^2 \cdot day$; and in Example 5, the strength was 1600 N and the water vapor transmission rate was 10.2 $g/m^2 \cdot day$. All the sheets with the above-mentioned thicknesses have acceptable strength and water vapor transmission rate and are thus usable.

Comparative Example 1

Spray coating to concrete at a construction site was reproduced. Under a work environment at a controlled temperature of about 25° C., an undercoat layer containing an epoxy resin was formed on a concrete plate by spray coating. A single polymer cement layer 2 having a thickness of 1.47 mm was formed by spray coating once on a processing paper. Then, a single resin layer having a thickness of 100 µm was formed by spray coating once on the polymer cement layer 2. It took two days to form each layer because of the time to stand still after coating (room temperature, 12 hours) and the time to dry (40° C., 24 hours). The total thickness of the polymer cement layer and the resin layer was 1.57 mm. After drying, the applied coat, i.e., a stack of the polymer cement layer and the resin layer, was separated from the processing paper and the tensile strength at break was measured using a tensile tester (available from Shimadzu Corporation, AGS-J).

Comparative Example 2

The controlled temperature of the work environment in Comparative Example 1 was changed to about 40° C. A stack of two polymer cement layers having a thickness of 1.18 mm was formed by spray coating twice. A stack of two resin layers having a thickness of 100 μm was formed by spray coating twice. The total thickness of the structure protection sheet was 1.28 mm. Other conditions were the same as those in Comparative Example 1.

Comparative Example 3

The controlled temperature of the work environment in Comparative Example 3 was changed to about 10° C. A stack of two polymer cement layers having a thickness of 1.29 mm was formed by spray coating twice. A stack of two resin layers having a thickness of 100 μm was formed by spray coating twice. The total thickness of the structure protection sheet was 1.39 mm. Other conditions were the same as those in Comparative Example 1.

[Strength and Water Vapor Transmission Rate]

In Comparative Examples 1 to 3, strength and water vapor transmission rates were measured as in Examples 3 to 5. The measurement results at a width of 50 mm were as follows: in Comparative Example 1, the strength was 375 N and the water vapor transmission rate was 10.2 g/m$^2$·day; in Comparative Example 2, the strength was 275 N and the water vapor transmission rate was 11.3 g; and in Comparative Example 3, the strength was 325 N and the water vapor transmission rate was 11.4 g. In Comparative Example 2, the viscosity rapidly increased during coating. Presumably, the usable time is quite short. In Comparative Example 3, the surface after coating and drying became whitish. In Comparative Examples 1 to 3, no mesh layer was provided and therefore the strength was inferior to that of Examples. Comparative Examples 1 to 3 were reproductions of spray coating to concrete at a construction site. All the sheets have a large thickness variation that is remarkably larger than the range of the present invention, ±100 μm. Specifically, they have a thickness variation in a range of 222 μm (±111 μm) to 260 μm (±130 μm).

Example 6

As in Example 1, the emulsion composition was applied to a release sheet, and then cured by heat treatment to form a resin layer. The pattern of the matted PP lamination paper was transferred to the resin layer in a curing process to impart a design property.

Thereafter, a structure protection sheet was produced as in Example 1, and wound up into a roll as in Example 1.

A structure protection sheet in a size of 10 cm×10 cm was cut out from the structure protection sheet 1 roll and the release sheet was peeled off to confirm that the release sheet was favorably peeled off and the surface of the resin layer was favorably matted.

Example 7

A structure protection sheet was produced as in Example 6, except that the PP lamination paper was preliminarily subjected to mirror finishing instead of embossing.

The mirror finishing was performed by pressing a drum having a mirror surface against the PP lamination paper.

Comparative Example 4

A structure protection sheet was produced as in Example 6, except that the PP lamination paper was not preliminarily subjected to embossing.

[Evaluation on Design Property]

Each of the structure protection sheets produced in Examples 6 and 7 and Comparative Example 4 was cut into a size of 5 cm×5 cm, and placed side by side on a mount.

All the release papers were peeled off, and illumination was uniformly applied from the direction in which the release paper was present using a desk lighting stand, and the reflected image of the lighting device was visually checked.

Figure 9:
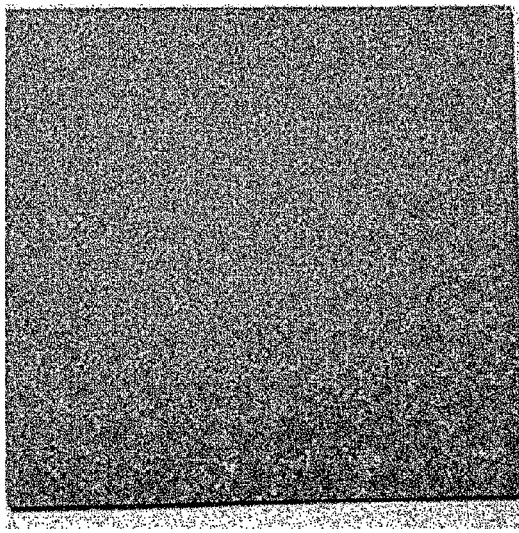
FIG. 9(a) is a photograph of the structure protection sheet according to Example 6.
FIG. 9(b) is a photograph of the structure protection sheet according to Example 7.
FIG. 9(c) is a photograph of the structure protection sheet according to Comparative Example 4.
Figure 9:
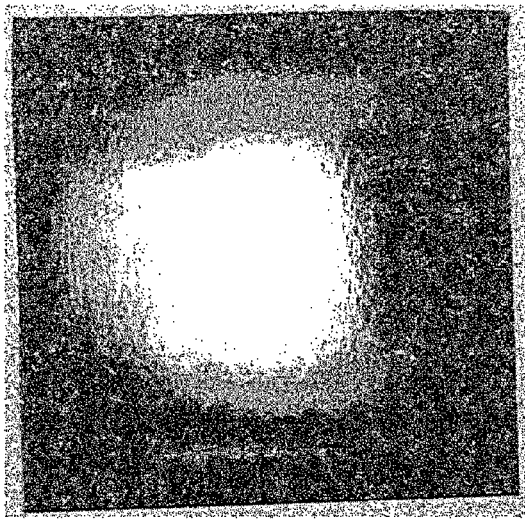
Figure 9:
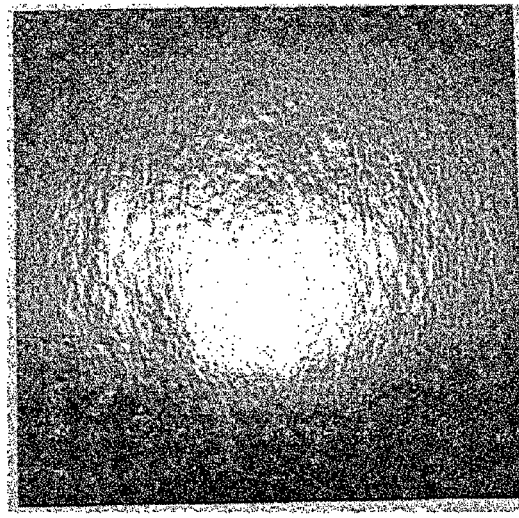

Photographic materials obtained by observing Examples 6 and 7 and Comparative Example 4 are shown in FIG. 9(a) to 9(c), respectively.

The structure protection sheet of Comparative Example 4 showed reflection to such an extent that the shape of the lighting stand could be visually recognized.

The structure protection sheet of Example 7 showed reflection to such an extent that the shape of the lighting stand could be more clearly recognized, compared to Comparative Example 1.

On the other hand, in Example 6, since the light from the lighting stand was sufficiently scattered, the presence of the lighting stand was not visually recognized, and the reflected light was uniform to such an extent that the presence of the light source, the lighting stand, was not recognized from the reflected light.

Example 7

A release sheet including a PP lamination paper and having a thickness of 130 μm was used.

A resin layer-forming composition containing an acrylic resin was applied to the release sheet and dried to form a single resin layer having a thickness of 100 μm.

Then, a polymer cement cured layer-forming composition was applied to the resin layer and dried to form a single polymer cement cured layer having a thickness of 1.29 mm.

Thus, a structure protection sheet having a total thickness of 1.39 mm was produced. The structure protection sheet was continuously produced in a factory at a controlled temperature of about 25° C., and wound up together with the release sheet into a roll.

The resin layer-forming composition is an acrylic silicone resin. This acrylic silicone resin is an emulsion composition containing 60 parts by weight of an acrylic silicone resin, 25 parts by weight of titanium dioxide, 10 parts by weight of ferric oxide, and 5 parts by weight of carbon black.

The polymer cement cured layer-forming composition is a water-based acrylic emulsion containing 45 parts by weight of a cement mixture. The cement mixture at least contains 70±5 parts by mass of Portland cement, 10±5 parts by mass of silicon dioxide, 2±1 parts by mass of aluminum oxide, and 1 to 2 parts by mass of titanium oxide. The acrylic emulsion at least contains 53±2 parts by mass of an acrylic acid polymer prepared by emulsion polymerization of an acrylate monomer using an emulsifier and 43±2 parts by mass of water. The polymer cement cured layer obtained by applying and drying the polymer cement cured layer-forming composition obtained by mixing the mixture and the emulsion is a composite layer in which the acrylic resin has a Portland cement content of 50% by mass.

The structure protection sheet obtained by the above method was attached to concrete by the following process.

To a building concrete basic block was applied a primer layer-forming resin composition, trade name "ARON-BULLCOAT (registered trademark) P-300" (available from Toagosei Co., Ltd.) to a thickness of 150 μm, and the polymer cement cured layer side face of the structure protection sheet was directly pressure-bonded to the composition-applied face in a wet state (as a primer layer) without waiting for drying. Then, the release sheet was peeled off.

The primer layer was cured by standing for 24 hours. Thus, a cured primer layer was obtained.

In this step, on the building concrete basic block were laminated the polymer cement cured layer and the resin layer in the stated order via the primer layer alone.

Comparative Example 5

The structure protection sheet produced according to Example 7 was attached to concrete by the following process.

To a building concrete basic block was applied a primer layer-forming resin composition (trade name: ARONBULLCOAT (registered trademark) P-300, available from Toagosei Co., Ltd.) to a thickness of 150 μm and dried. Then, a polyurethane resin adhesive agent (trade name: Bond (registered trademark) VM Netless Intermediate Coating (KONISHI CO., LTD.)) was applied thereto to a thickness of 200 μm. The polymer cement cured layer side face of the structure protection sheet was directly pressure-bonded to the adhesive agent-applied face in a wet state without waiting for drying. Then, the release sheet 4 was peeled off.

The primer layer and the adhesive layer were cured by standing for 24 hours.

Thus, the structure protection sheet obtained in Comparative Example 5 was attached to the building concrete basic block so that the polymer cement cured layer was in contact with the adhesive (layer).

In this process, on the building concrete basic block were laminated the polymer cement cured layer and the resin layer in the stated order via the primer layer and the adhesive layer.

(Evaluation of Examples and Comparative Examples)

The bonding strength of the structure protection sheet was measured for each of the building concrete blocks reinforced with the structure protection sheet produced in Example 7 and Comparative Example 5.

The bonding strength was measured in accordance with the article 7.10 "Bond Strength Test" in JIS A6909:2014 "Coating materials for textured finishes of buildings". The loading rate for which control was requested in the article 7.10.2 "Test procedure" a was 1500 N/min in the test.

As a result of the test, the peel force of the structure protection sheet in Example 7 was 1.40 N/mm², and that in Comparative Example 1 was 1.40 N/mm².

It was found that there was almost no difference in peel force between Example 7 and Comparative Example 5. In other words, it became clear that the structure protection sheet of the present invention exhibited necessary and sufficient adhesive strength to a concrete structure even when application of an adhesive layer, which had been considered to be essential in combination with primer application in adhesion to concrete, was omitted.

Reference Example 1

A resin layer was formed as in Example 1 except that the thickness was changed to 50 μm.

Next, on the formed resin layer was disposed a mesh layer having a density of 1.0 lines/cm and a pitch of 10 mm.

Then, a water-based acrylic emulsion containing 45 parts by mass of a cement mixture and 4% by mass of calcium silicate hydrate as a curing accelerator was prepared as a polymer cement cured layer-forming composition.

Here, the cement mixture at least contained 70±5 parts by mass of Portland cement, 10±5 parts by mass of silicon dioxide, 2±1 parts by mass of aluminum oxide, and 1 to 2 parts by mass of titanium oxide. The acrylic emulsion at least contained 53±2 parts by mass of an acrylic acid polymer obtained by emulsion polymerization using an acrylate monomer as an emulsifier, and 43±2 parts by mass of water. The mixture and the emulsion were mixed at a stirring speed under the conditions shown in Table 1 below to prepare a polymer cement cured layer-forming composition.

The polymer cement cured layer-forming composition was applied to the resin layer, air-dried for five minutes, and cured at a curing temperature of 60° C. to form a single polymer cement cured layer having a thickness of 1.29 mm. Thus, a structure protection sheet in which a mesh layer is provided at the interface (S/HC interface) between the resin layer(S) and the polymer cement cured layer (HC).

Reference Examples 2 to 9

Structure protection sheets of Reference Examples 2 to 9 were produced as in Reference Example 1, except that the thickness of the resin layer, the amount of the curing accelerator in the polymer cement cured layer-forming composition, the setter/base ratio, the air-dry time, the curing temperature, and the stirring speed were changed as shown in Table 1 below.

Reference Example 10

A polymer cement cured layer-forming composition prepared as in Reference Example 1 was applied to the resin layer to a thickness before drying of 1.0 mm, and then a mesh layer having a density of 1.0 lines/cm and a pitch of 10 mm was disposed thereon. Then, a structure protection sheet of Reference Example 10 was produced as in Reference Example 1, except that the polymer cement cured layer-forming composition was further applied to the mesh layer to a thickness before drying of 1.0 mm and then dried to form a polymer cement cured layer having a thickness of 1.29 mm.

Reference Examples 11 to 18

Structure protection sheets of Reference Examples 11 to 18 were produced as in Reference Example 10, except that the thickness of the resin layer, the amount of the curing accelerator in the polymer cement cured layer-forming composition, the setter/base ratio, the air-dry time, the drying temperature, and the stirring speed were changed as shown in Table 1 below.

The structure protection sheets of Reference Examples 1 to 18 were each attached to a concrete surface via an adhesive agent (available from Toagosei Co., Ltd., Aron Alpha (registered trademark) impact resistance for professional use), and a tensile jig was fixed to the resin layer surface using an adhesive agent (available from Toagosei Co., Ltd., Aron Alpha (registered trademark) impact resistance for professional use).

Next, using a universal tester, the tensile jig was pulled to the side opposite to the concrete side, and the strength at which tensile delamination occurred was measured as bonding strength.

TABLE 1

| Reference Example | Mesh layer position | Setter/base ratio | Curing temperature | Air-dry time | Thickness of resin layer | Proportion of curing accelerator | Stirring speed | Bonding strength [N/mm²] | Average of bonding strength [N/mm²] |
|---|---|---|---|---|---|---|---|---|---|
| 1 | S/HC interface | 5:5 | 60° C. | 5 min | 50 μm | 4% | 1000 rpm | 0.77 | 0.85 |
| 2 | S/HC interface | 5:3 | 80° C. | 20 min | 100 μm | 5% | 2000 rpm | 0.86 | |
| 3 | S/HC interface | 6:2 | 100° C. | 30 min | 150 μm | 6% | 3000 rpm | 1.05 | |
| 4 | S/HC interface | 5:5 | 60° C. | 20 min | 100 μm | 6% | 3000 rpm | 0.65 | |
| 5 | S/HC interface | 5:3 | 80° C. | 30 min | 150 μm | 4% | 1000 rpm | 0.86 | |
| 6 | S/HC interface | 6:2 | 100° C. | 5 min | 50 μm | 5% | 2000 rpm | 0.93 | |
| 7 | S/HC interface | 5:5 | 80° C. | 5 min | 150 μm | 5% | 3000 rpm | 0.56 | |
| 8 | S/HC interface | 5:3 | 100° C. | 20 min | 50 μm | 6% | 1000 rpm | 1.04 | |
| 9 | S/HC interface | 6:2 | 60° C. | 30 min | 100 μm | 4% | 2000 rpm | 0.96 | |
| 10 | HC 1/2 | 5:5 | 100° C. | 30 min | 100 μm | 5% | 1000 rpm | 0.75 | 0.67 |
| 11 | HC 1/2 | 5:3 | 60° C. | 5 min | 150 μm | 6% | 2000 rpm | 0.79 | |
| 12 | HC 1/2 | 6:2 | 80° C. | 20 min | 50 μm | 4% | 3000 rpm | 0.54 | |
| 13 | HC 1/2 | 5:5 | 80° C. | 30 min | 50 μm | 6% | 2000 rpm | 0.65 | |
| 14 | HC 1/2 | 5:3 | 100° C. | 5 min | 100 μm | 4% | 3000 rpm | 0.79 | |
| 15 | HC 1/2 | 6:2 | 60° C. | 20 min | 150 μm | 5% | 1000 rpm | 0.54 | |
| 16 | HC 1/2 | 5:5 | 100° C. | 20 min | 150 μm | 4% | 2000 rpm | 0.74 | |
| 17 | HC 1/2 | 5:3 | 60° C. | 30 min | 50 μm | 5% | 3000 rpm | 0.85 | |
| 18 | HC 1/2 | 6:2 | 80° C. | 5 min | 100 μm | 6% | 1000 rpm | 0.38 | |

Figure 12:
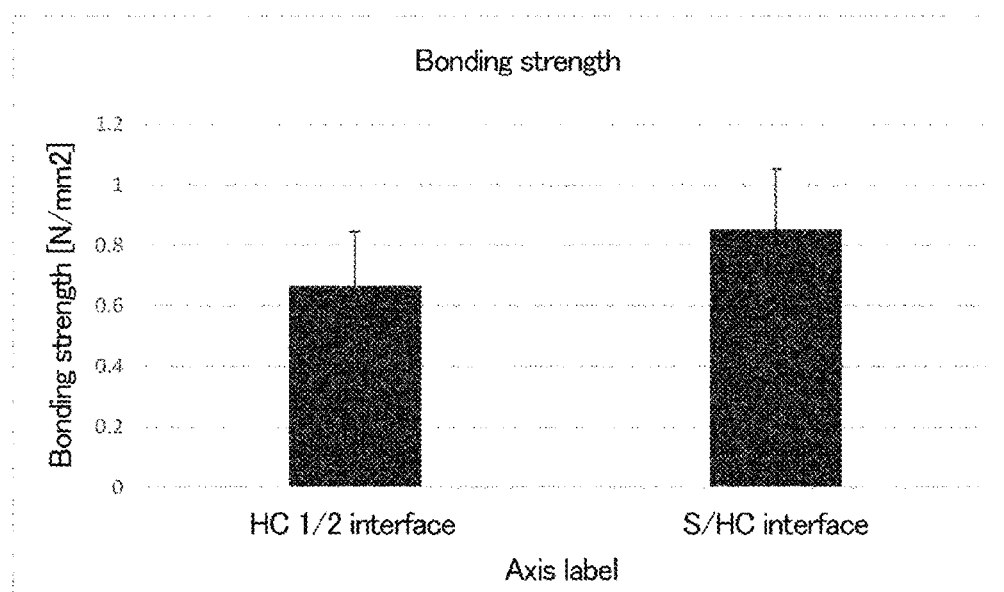
FIG. 12 illustrates a graph showing an average value of bonding strength of a structure protection sheet according to a reference example.

The graph showing the bonding strengths of the structure protection sheets of Reference Examples 1 to 18 is shown in FIG. 12. As shown in Table 1 and FIG. 12, the structure protection sheets of Reference Examples 1 to 9 in which the mesh layer was disposed at the interface between the polymer cement cured layer and the resin layer were clearly superior in bonding strength to the structure protection sheets of Reference Examples 10 to 18 in which the mesh layer was disposed in the polymer cement cured layer.

Reference Examples 1 to 9 and Reference Examples 10 to 18 were produced under the same conditions except that the position of the mesh layer was different. Even a comparison of respective reference examples shows that the bonding strength was better when the mesh layer was disposed at the interface between the polymer cement cured layer and the resin layer than when the mesh layer was disposed in the polymer cement cured layer.

REFERENCE SIGNS LIST 1 structure protection sheet
2 polymer cement cured layer
3 resin layer
3' uncured resin layer
4 release sheet
5 mesh layer
7 primer layer
10 embossing roll
21 structure (concrete)
21' concrete composition (structure-forming composition)
22 undercoat layer
23 adhesive agent
24 molding frame

The invention claimed is:

1. A structure protection sheet comprising:
a polymer cement cured layer on a side facing a structure;
a resin layer on the polymer cement cured layer; and
a mesh layer,
the structure protection sheet having a water vapor transmission rate of 10 to 50 g/m²·day,
the mesh layer having a structure in which warp and weft fibers are arranged in a lattice form, and
the mesh layer being present inside the polymer cement cured layer.

2. The structure protection sheet according to claim 1, wherein the structure protection sheet has a sulfuric acid penetration depth of 0.1 mm or less after being immersed in a 5% sulfuric acid aqueous solution for 30 days in a state of covering a building concrete basic block.

3. The structure protection sheet according to claim 1, wherein the polymer cement cured layer contains a cement component and a resin, and the resin is contained in an amount of 10% by weight or more and 40% by weight or less.

4. The structure protection sheet according to claim 1, which is used in a state of a stack including two or more sheets.

5. The structure protection sheet according to claim 1, wherein the structure protection sheet has a tear load of 3 to 20 N as measured in conformity with a description in an article regarding a tear load test in JIS K 6781.

6. The structure protection sheet according to claim 1, wherein the mesh layer has a line pitch of 50 to 1.2 mm.

7. The structure protection sheet according to claim 1, wherein the mesh layer is composed of at least one selected from the group consisting of polypropylene fibers, vinylon fibers, carbon fibers, aramid fibers, glass fibers, polyester fibers, polyethylene fibers, nylon fibers, and acrylic fibers.

8. A concrete block obtainable by attaching the polymer cement cured layer of the structure protection sheet according to claim 1, to a surface of a concrete block via an adhesive layer.

9. The concrete block according to claim 8, wherein the adhesive agent comprises a urethane adhesive agent, an adhesive agent containing acrylic resins having characteristics of rubber, or a resin component that constitutes the polymer cement cured layer.

10. A method for producing a reinforced structure using the structure protection sheet according to claim 1, the method comprising:
applying an adhesive agent to a structure; and
attaching the structure protection sheet to the structure.

11. The method for producing a reinforced structure according to claim 10, further comprising
providing an undercoat layer between the structure and the adhesive agent.

12. The method for producing a reinforced structure according to claim 10, wherein the undercoat layer comprises a solvent-type epoxy resin solvent solution, an epoxy resin emulsion, or an adhesive agent.

13. The structure protection sheet according to claim 1, wherein the mesh layer comprises at least one type of fiber selected from the group consisting of polypropylene fibers, vinylon fibers, carbon fibers, aramid fibers, glass fibers, and nylon fibers.

14. The structure protection sheet according to claim 1, wherein the mesh layer comprises polypropylene fibers.

15. The structure protection sheet according to claim 1, wherein the mesh layer comprises vinylon fibers.

16. The structure protection sheet according to claim 1, wherein the mesh layer is impregnated with a material constituting the polymer cement cured layer.

17. The structure protection sheet according to claim 1, wherein the mesh layer has a linear density of 0.2 to 8.0 lines/cm.

18. The structure protection sheet according to claim 1, wherein the mesh layer is present at a position of half the thickness of the polymer cement cured layer.

19. The structure protection sheet according to claim 1, wherein the mesh layer is embedded inside the polymer cement cured layer.

20. The structure protection sheet according to claim 1, wherein the structure protection sheet excludes the mesh layer at the interface between the polymer cement cured layer and the resin layer.

* * * * *